United States Patent [19]

Byers et al.

[11] Patent Number: 5,680,537
[45] Date of Patent: Oct. 21, 1997

[54] METHOD AND APPARATUS FOR ISOLATING AN ERROR WITHIN A COMPUTER SYSTEM THAT TRANSFERS DATA VIA AN INTERFACE DEVICE

[75] Inventors: Larry L. Byers, Apple Valley; Gary R. Robeck, Albertville; Terry J. Brunmeier; John A. Miller, both of Shoreview, all of Minn.

[73] Assignee: Unisys Corporation, Blue Bell, Pa.

[21] Appl. No.: 396,678

[22] Filed: Mar. 1, 1995

[51] Int. Cl.[6] .................................................. G06F 13/00
[52] U.S. Cl. ................................................... 395/182.03
[58] Field of Search ........................ 395/182.03, 200, 395/800, 375, 650; 364/229, 229.1, 265.4, 265.6, 268.3; 371/68.1

[56] References Cited

U.S. PATENT DOCUMENTS

| | | | |
|---|---|---|---|
| 4,020,466 | 4/1977 | Cordi et al. | 340/172.5 |
| 4,084,231 | 4/1978 | Capozzi et al. | 364/200 |
| 4,298,929 | 11/1981 | Capozzi | 364/200 |
| 4,453,215 | 6/1984 | Reid | 364/200 |
| 4,486,826 | 12/1984 | Wolff et al. | 364/200 |
| 4,597,084 | 6/1986 | Dynneson et al. | 371/51 |
| 4,646,229 | 2/1987 | Boyle | 364/200 |
| 4,654,857 | 3/1987 | Samson et al. | 371/68 |
| 4,853,843 | 8/1989 | Ecklund | 364/200 |
| 5,032,979 | 7/1991 | Hecht et al. | 364/200 |
| 5,089,958 | 2/1992 | Horton et al. | 395/575 |
| 5,093,787 | 3/1992 | Simmons | 364/406 |
| 5,146,573 | 9/1992 | Sato et al. | 395/425 |
| 5,202,969 | 4/1993 | Sato et al. | 395/425 |
| 5,222,224 | 6/1993 | Flynn et al. | 395/425 |
| 5,307,484 | 4/1994 | Baker et al. | 395/600 |
| 5,410,545 | 4/1995 | Porter et al. | 371/21.6 |
| 5,412,666 | 5/1995 | Squires et al. | 371/37.4 |

OTHER PUBLICATIONS

Kaunitz et al., "Audit Trail Compaction for Database Recovery", *Communications of the ACM*, vol. 27, No. 7, Jul. 1984.
Verhofstad, "Recovery Techniques for Database Systems", *Computing Surveys*, vol. 10, No. 2, Jun. 1978.
Gray et al., "The Recovery manager of the System R Database Manager", *Computing Surveys*, vol. 13, No. 2, Jun. 1981.

*Primary Examiner*—Robert W. Beausoliel, Jr.
*Assistant Examiner*—Stephen C. Elmore
*Attorney, Agent, or Firm*—Nawrocki, Rooney & Sivertson, P.A.

[57] ABSTRACT

A method and apparatus for isolating an error in a system having a controller or the like which access a user via an interface device. The controller or the like may be coupled to the interface device via a first bus and the interface device may be coupled to the user via a second bus. The controller or the like may detect an error in a data transfer from the user to the controller via the interface device, and may isolate the error to the second bus/interface device or the first bus/controller. This up-front error isolation may reduce the amount of analysis required by a service technician after a corresponding PC board or the like is removed from the system, thereby reducing the cost thereof.

17 Claims, 21 Drawing Sheets

| SIGNAL | SIGNAL DESCRIPTION |
|---|---|
| D(0-31) | DSD DATA BUS (LO.Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (LO.Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (LO.Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (LO.Z) - WHEN ASSERTED BY THE BUS MASTER, THE CONTENTS OF THE ADDRESS BUS ARE VALID - DEFINES THE START OF A BUS CYCLE |
| W-R/ | WRITE/READ (LO.Z) - INDICATES THE DIRECTION OF DATA TRANSFER RELATIVE TO THE BUS MASTER - DRIVEN BY THE BUS MASTER. WRITE=1, READ=0. |
| HOLD/ | HOLD (I) - ASSERTED BY DEVICE TO INDICATE THAT IT IS REQUESTING BUS MASTERSHIP |
| HLDAI/ | HOLD ACKNOWLEDGE (I) - ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 9A

| SIGNAL | SIGNAL DESCRIPTION |
|---|---|
| BE3/ | BYTE ENABLE THREE (I,O,Z) - ENABLES DATA TRANSFER ON DATA BUS LINES D0-D7 - ASSERTED BY BUS MASTER |
| BE2/ | BYTE ENABLE TWO (I,O,Z) - ENABLES DATA TRANSFER ON DATA BUS LINES D8-D15 - ASSERTED BY BUS MASTER |
| BE1/ | BYTE ENABLE ONE (I,O,Z) - ENABLES DATA TRANSFER ON DATA BUS LINES D16-D23 - ASSERTED BY BUS MASTER |
| BE0/ | BYTE ENABLE ZERO (I,O,Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

FIG. 9B

| STATUS REG ERROR | SLAVE READ ERROR | ERROR ISOLATION |
|---|---|---|
| NO | NO | NO ERROR |
| NO | YES | DSD BUS FAULT OR DSDC FAULT |
| YES | NO | SCSI BUS FAULT OR NCR FAULT |
| YES | YES | DSD BUS FAULT OR DSDC FAULT |

FIG. 16

METHOD AND APPARATUS FOR ISOLATING AN ERROR WITHIN A COMPUTER SYSTEM THAT TRANSFERS DATA VIA AN INTERFACE DEVICE

CROSS REFERENCE TO CO-PENDING APPLICATIONS

The present application is related to U.S. patent application Ser. No. 08/396,951, filed Mar. 1, 1995, entitled "Method and Apparatus For Storing Computer Data After a Power Failure", which is assigned to the assignee of the present invention and is incorporated herein by reference.

BACKGROUND OF THE INVENTION

1. Field of the Invention

The present invention generally relates to general purpose digital data processing systems and more particularly relates to such systems which provide error detection therein.

2. Description of the Prior Art

A key design element of high reliability computer systems is that of error detection and correction. It has long been recognized that the integrity of the data bits within the computer system is critical to ensure the accuracy of operations performed in the data processing system. The alteration of a single data bit in a data word can dramatically affect arithmetic calculations or can change the meaning of a data word as interpreted by other sub-systems within the computer system.

One method for performing error detection is to associate an additional bit, called a "parity bit", along with the binary bits comprising a data word. The data word may comprise data, an instruction, an address, etc. Parity involves summing without carry the bits representing a "one" within a data word and providing an additional "parity bit" so that the total number of "ones" across the data word, including the added parity bit, is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. For example, when the system stores a data word into a memory, the parity generation circuit generates a parity bit from the data word and the system stores both the data word and the corresponding parity bit into an address location in the memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified. It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of a multiple errors within a data word increase. Therefore, methods to detect multiple errors within a data word are essential. In response thereto, system designers have developed methods for detecting multiple errors within multiple bit data words by providing multiple parity bits for each multiple bit data word.

Parity generation techniques are also used to perform error correction within a data word. Error correction is typically performed by encoding the data word to provide error correction code bits which are then stored along with the bits of the data word. Upon readout, the data bits read from the addressable memory location are again subject to the generation of the same error correction code signal pattern. The newly generated pattern is compared to the error correction code signals stored in memory. If a difference is detected, it is determined that the data word is erroneous. Depending on the encoding system utilized it is possible to identify and correct the bit position in the data word indicated as being incorrect.

The above referenced error detection and correction schemes may be used on a number of internal nodes within a computer system. That is, the source of an error may be isolated to a corresponding hardware block. However, many of the internal nodes within a computer system may not be accessible to a system designer and therefore incapable of being provided with an error detection or correction capability. For example, many modern computer systems utilize a number of standard off-the-shelf parts for performing various functions therein. Standard parts may be far less expensive than custom designed parts and thus may be attractive to system designers. The use of standard parts, however, has a number of disadvantages. One such disadvantage is that a standard part may not provide the precise functionality desired by the system designer. A typical function of concern in high reliability computer systems may be error detection and correction. A standard part may only provide a limited error detection and correction capability, an incompatible error detection and correction capability, or may provide no error detection and correction capability whatsoever. System designers must balance the cost savings associated with the use of a standard part with the impact the standard part may have on system functionality, performance, and/or reliability.

Standard parts are commonly used in system I/O applications. Many of the I/O protocols used by modern computer systems have been standardized thereby allowing computer components provided by different manufacturers to communicate. Some of the standards have been developed by the government and others by industry. In one example, the SCSI interface protocol is a standard serial I/O protocol. The SCSI interface protocol is commonly used for accessing storage disks and other I/O peripherals. In such applications, the use of a standard part is often more desirable than designing a custom part to perform the same function.

As indicated above, standard parts may not provide the desired error detection and correction capability. This may be especially true for high reliability computer applications. In such applications, the error detection and correction capability of a standard part may not meet system requirements. For example, in a system wherein a controller accesses a disk drive via a standard SCSI interface part, the standard SCSI interface part may only be capable of performing error detection. That is, if an error occurs on the SCSI interface, the standard SCSI interface part may detect the error, but then may provide uncorrected data to the controller. In such standard parts, the parity error may be indicated in a status register or the like located within the standard SCSI interface part. The controller must monitor the status register or the like to determine if an error has occurred. Further, the standard SCSI interface part may only provide an interrupt to the controller, thereby indicating an error has been detected, but only after a number of data transfers have been made to the controller. One such standard SCSI interface part may be an NCR53C720 SCSI I/O processor, available from the NCR corporation.

In a typical system, a controller or the like may be coupled to a number of users. The controller may communicate with the number of users via a first bus. The number of users and the controller may communicate over the first bus using a predefined bus protocol. When it is desirable to provide a user which has an incompatible interface protocol, an interface device may be used. The interface device may be coupled to the first bus and may communicate with the number of users and the controller using the predefined bus protocol. The interface device may also be coupled to the user having the incompatible interface protocol via a second bus. In such a system, the interface device may provide an interface between the predefined bus protocol of the first bus and the incompatible bus protocol of the second bus. The interface device may be a standard part as described above.

Because the interface device may not provide the desired error detection and correction capability, the source of an error detected by the controller may be unknown. That is, when data is transferred from the user having the incompatible interface protocol via the interface device, the controller may detect an error. Since the interface device may pass uncorrected data to the controller, the source of the error may be unknown. For example, the source of the error may be the second bus, the interface device, the first bus, or the controller itself. In prior art systems, errors of this nature may be analyzed after a corresponding PC board or the like containing the controller and the interface device is removed from the system. A dedicated test system my be used to recreate the failed operation to help identify the source of the error. This post-occurrence analysis may require the attention of a service technician and a dedicated test system, and thus may be relatively expensive.

SUMMARY OF THE INVENTION

The present invention overcomes many of the disadvantages of the prior art by providing a method and apparatus for isolating an error within a computer system which transfers data via an interface device. That is, the present invention may provide a means for isolating an error in a system having a controller or the like which access a user via an interface device. The controller may be coupled to the interface device via a first bus and the interface device may be coupled to the user via a second bus. The controller may detect an error in a data transfer from the user to the controller via the interface device, and may isolate the error to the second bus/interface device or the first bus/controller. This up-front error isolation may reduce the amount of analysis required by a service technician after a corresponding PC board or the like is removed from the system, thereby reducing the cost thereof.

In an exemplary embodiment, a controller may be coupled to a number of users via a first bus. The number of users and the controller may communicate over the first bus using a predefined bus protocol. An interface device may be coupled to the first bus and may communicate with the number of users and the controller using the predefined bus protocol. A user having an incompatible interface may be coupled to the interface device wherein the user having the incompatible interface may communicate with the number of users and the controller via the interface device. The interface device may provide a limited error detection and correction capability, an incompatible error detection and correction capability, or may provide no error detection and correction capability whatsoever. In the exemplary embodiment, the interface device may have an error detection capability wherein the error detection capability may assert an error bit in a status register or the like within the interface device, when an error is detected on the second bus. The interface device may then pass the uncorrected data to the controller.

The controller may receive data transfers from the user having the incompatible interface via the interface device. The controller may have an error detection capability for detecting errors received thereby. The controller may thus detect an error provided by the interface device. To isolate the source of the detected error, the controller may read a status word from the status register of the interface device via the first bus. It is contemplated that the controller may ignore or otherwise prevent corrupted data from passing through the controller while performing error isolation. The controller may then perform error detection on the status word. If an error is detected, it is assumed that the source of the error is the first bus or the controller itself. If an error is not detected, the error bit of the status word may be analyzed. If the error bit indicates that the interface device detected an error on the first bus, it is assumed that the source of the error is the second bus or the interface device. Although this invention does not completely isolate the source of the error, the information provided thereby may greatly reduce the amount of analysis required by a service technician and/or a dedicated test system.

In another exemplary embodiment of the present invention, a DSDC, Data Save Disk Chip, device may be coupled to a disk controller and a memory device via a DSD Data Save Disk Chip bus. The DSDC device, disk controller, and the memory device may communicate via a predetermined bus protocol over the DSD bus. A disk storage element may be coupled to the disk controller via a SCSI bus. The SCSI bus protocol may not be compatible with the DSD bus protocol. In the exemplary embodiment, the disk storage element may comprise a number of SCSI disk drives. The disk storage element may communicate with the DSDC device via the disk controller.

The DSDC device may provide a data transfer path from the disk storage element to a non-volatile memory. The DSDC device may read or write a number of data elements from/to the disk storage element via the disk controller. The DSDC device may then write or read the number of data elements to/from a DBIF device. The DBIF device may then write or read the number of data elements to/from a non-volatile memory element via a number of streets. This data transfer path may be used to perform a fast data save and/or data restore operation from the non-volatile memory element to/from the disk storage element. The DSDC device may be controlled by a microsequencer. Further detail on the Data save disk (DSD) system may be found in the above referenced co-pending patent application, which is incorporated herein by reference.

In the exemplary embodiment, the disk controller may have an error detection capability wherein the error detection capability may assert an error bit in a status register or the like within the disk controller when an error is detected on the SCSI bus. The disk controller may then pass the uncorrected data to the DSDC device during a data transfer.

The DSDC device may receive a number of data elements from the disk storage element via the disk controller. The DSDC device may have an error detection capability for detecting errors received thereby. The DSDC device may thus detect an error provided by the disk controller. To isolate the source of the detected error, the DSDC device may read a status word from the status register of the disk controller via the DSD bus. It is contemplated that the DSDC device may ignore or otherwise prevent corrupted data from passing through the DSDC device to the DBIF device while performing error isolation. The DSDC device may then perform error detection on the status word. If an error is detected, it is assumed that the source of the error is the DSD bus or the DSDC device itself. If an error is not detected, the error bit of the status word may be analyzed. If the error bit indicates that the disk controller detected an error on the SCSI bus, it is assumed that the source of the error is the SCSI bus or the disk controller. Although this invention does not completely isolate the source of the error, the information provided thereby may greatly reduce the amount of analysis required by a service technician and/or a dedicated test system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 9A–9B comprise a table illustrating an exemplary bus description of the DSD bus of FIG. 7;

FIG. 16 is a table showing an exemplary error isolation algorithm of the present invention.

DETAILED DESCRIPTION OF THE PREFERRED EMBODIMENTS

Figure 1:
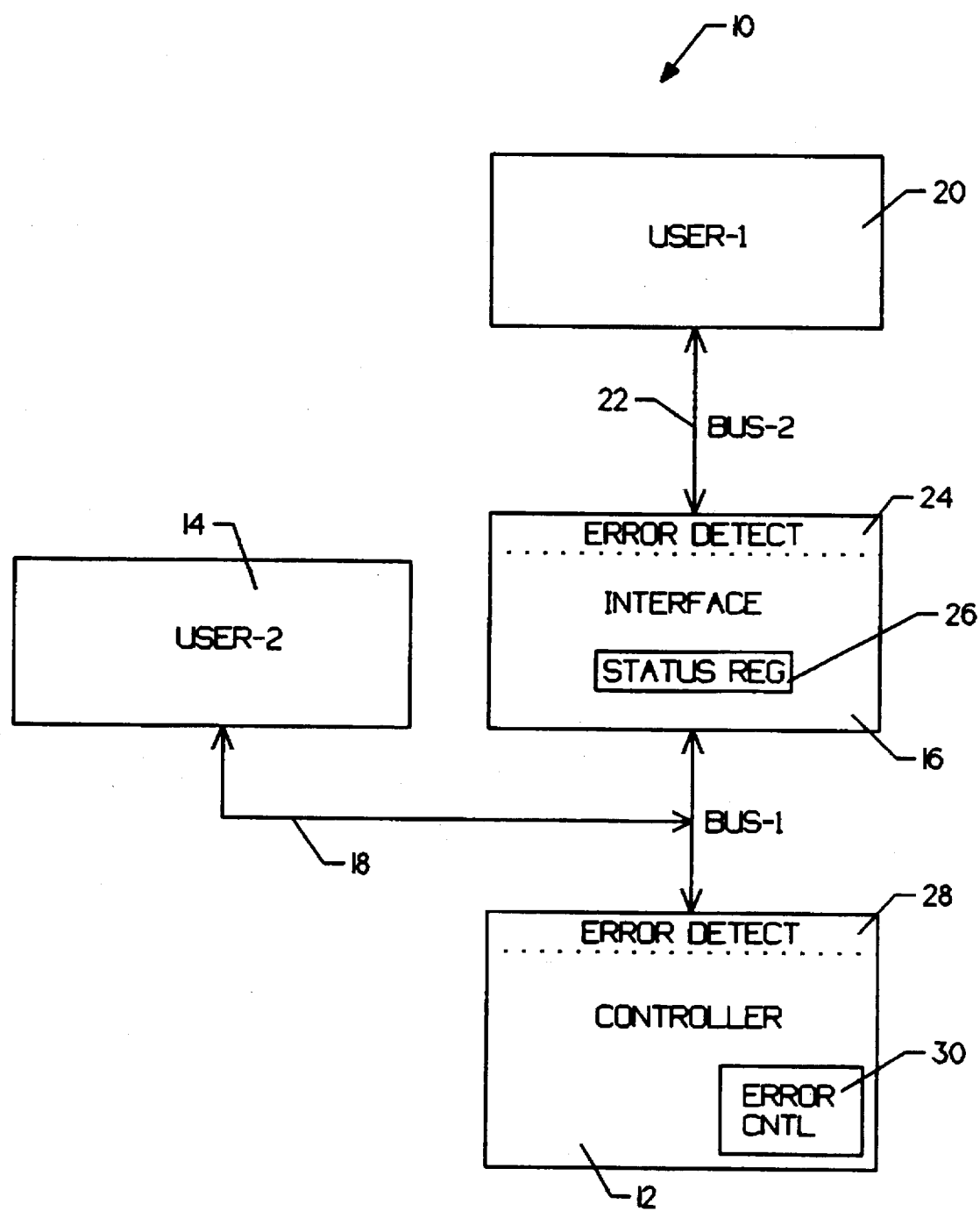
FIG. 1 is a block diagram of a first exemplary embodiment of the present invention.

FIG. 1 is a block diagram of a first exemplary embodiment of the present invention. The block diagram is generally shown at 10. The exemplary embodiment may provide a means for isolating an error in a system having a controller 12 or the like which access a user 20 via an interface device 16. Controller 12 or the like may be coupled to interface device 16 via a first bus 18 and interface device 16 may be coupled to user 20 via a second bus 22. Controller 12 or the like may detect an error in a data transfer from user 20 to controller 12 via an error detection capability 28, and may isolate the error to the second bus 22 and/or interface device 16 or the first bus 18 and/or controller 12. This up-front error isolation may reduce the amount of analysis required by a service technician after a corresponding PC board or the like is removed from the system, thereby reducing the cost thereof.

In the exemplary embodiment, controller 12 or the like may be coupled to a first user 14 via first bus 18. It is contemplated that there may be any number of users coupled to first bus 18. It is further contemplated that user 14 and controller 12 may each comprise a processor, a memory, an I/O device, or any other type of user which may be coupled to a bus. User 14 and controller 12 may communicate over first bus 18 using a predefined bus protocol. Interface device 16 may be coupled to first bus 18 and may communicate with user 14 and controller 12 using the predefined bus protocol. User 20, having an incompatible interface, may be coupled to interface device 16 wherein user 20 may communicate with user 14 and controller 12 via interface device 16. Interface device 16 may provide a limited error detection and correction capability, an incompatible error detection and correction capability, or may provide no error detection and correction capability whatsoever. In the exemplary embodiment, interface device 16 may have an error detection capability 24 wherein the error detection capability 24 may assert an error bit in a status register 26 or the like within interface device 16 when an error is detected on second bus 22. Interface device 16 may then pass the uncorrected data to controller 12 via first bus 18.

Controller 12 may receive data transfers from user 20 via interface device 16 as described above. Controller 12 may have error detection capability 28 for detecting errors received thereby. Controller 12 may thus detect an error provided by interface device 24. To isolate the source of the detected error, an error control block 30 within controller 12 may initiate a read operation of the status register 26 of interface device 16 via first bus 18, thereby resulting in a status word. It is contemplated that controller 12 may ignore or otherwise prevent corrupted data provided by interface device 16 from passing through or into controller 12 while performing error isolation. Controller 12 may then perform error detection on the status word via the error detection capability 28. If an error is detected, it is assumed that the source of the error is first bus 18 or controller 12. If an error is not detected, the error bit of the status word may be analyzed. If the error bit indicates that interface device 16 detected an error on first bus 22, it is assumed that the source of the error is second bus 22 or interface device 16. Although this invention does not completely isolate the source of the error, the information provided thereby may greatly reduce the amount of analysis required by a service technician and/or a dedicated test system.

Figure 2:
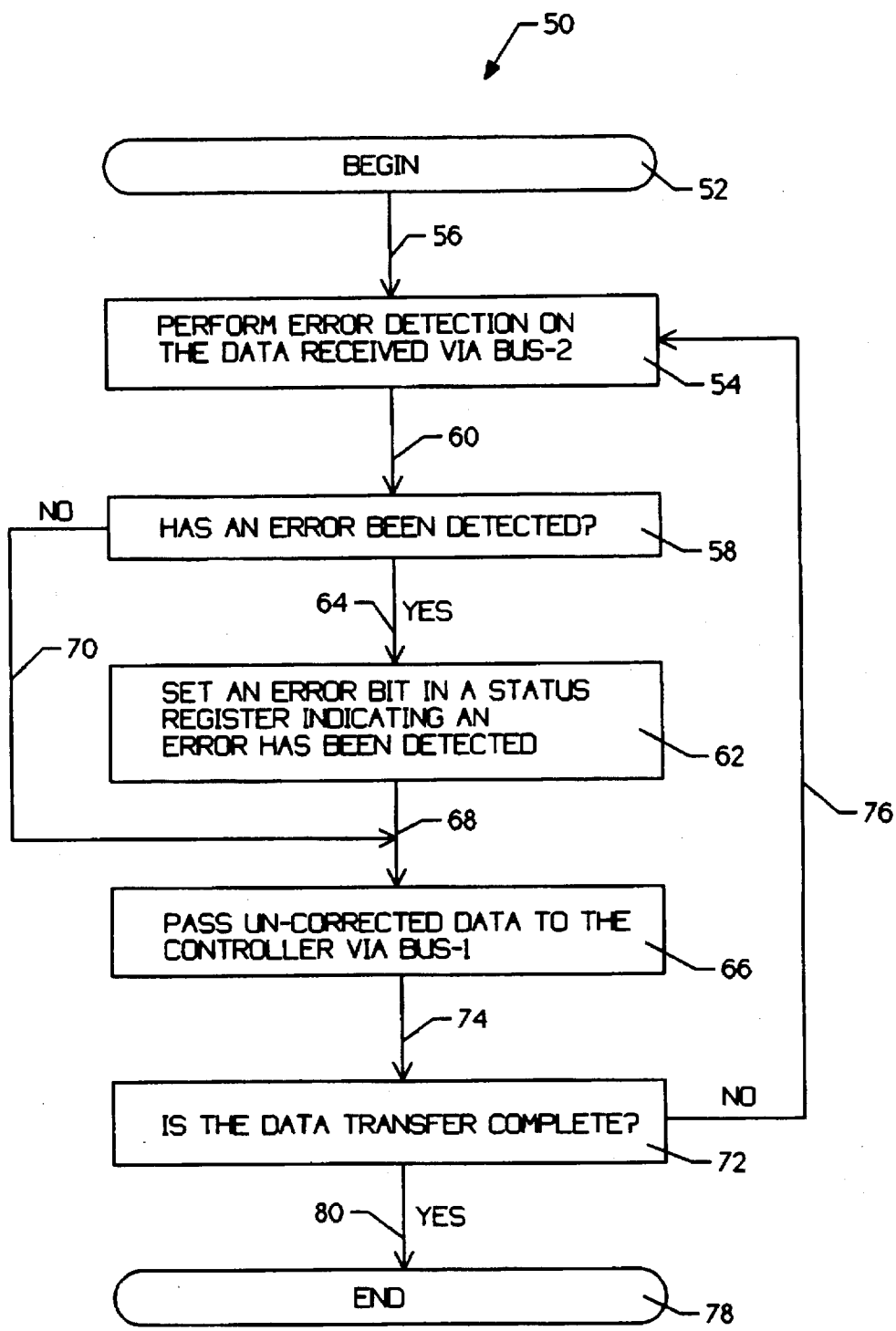
FIG. 2 is a flow diagram showing an exemplary operation of the interface device of FIG. 1.

FIG. 2 is a flow diagram showing an exemplary operation of the interface device of FIG. 1. The flow diagram is generally shown at 50. The algorithm is entered at element 52, wherein control is passed to element 54 via interface 56. Element 54 performs error detection on the data received from user-1 via bus-2. Control is then passed to element 58 via interface 60. Element 58 determines whether an error has been detected. If an error has been detected, control is passed to element 62 via interface 64. Element 62 sets an error bit in a status register within the interface device, thereby indicating an error has been detected. Control is then passed to element 66 via interface 68.

Referring back to element 58, if an error has not been detected, control is passed to element 66 via interface 70. Element 66 passes the uncorrected data from the interface device to the controller via bus-1. Control is then passed to element 72 via interface 74. Element 72 determines whether the data transfer is complete. If the data transfer is not complete, control is passed back to element 54 via interface 76. If the data transfer is complete, control is passed to element 78 via interface 80, wherein the algorithm is ended.

Figure 3:
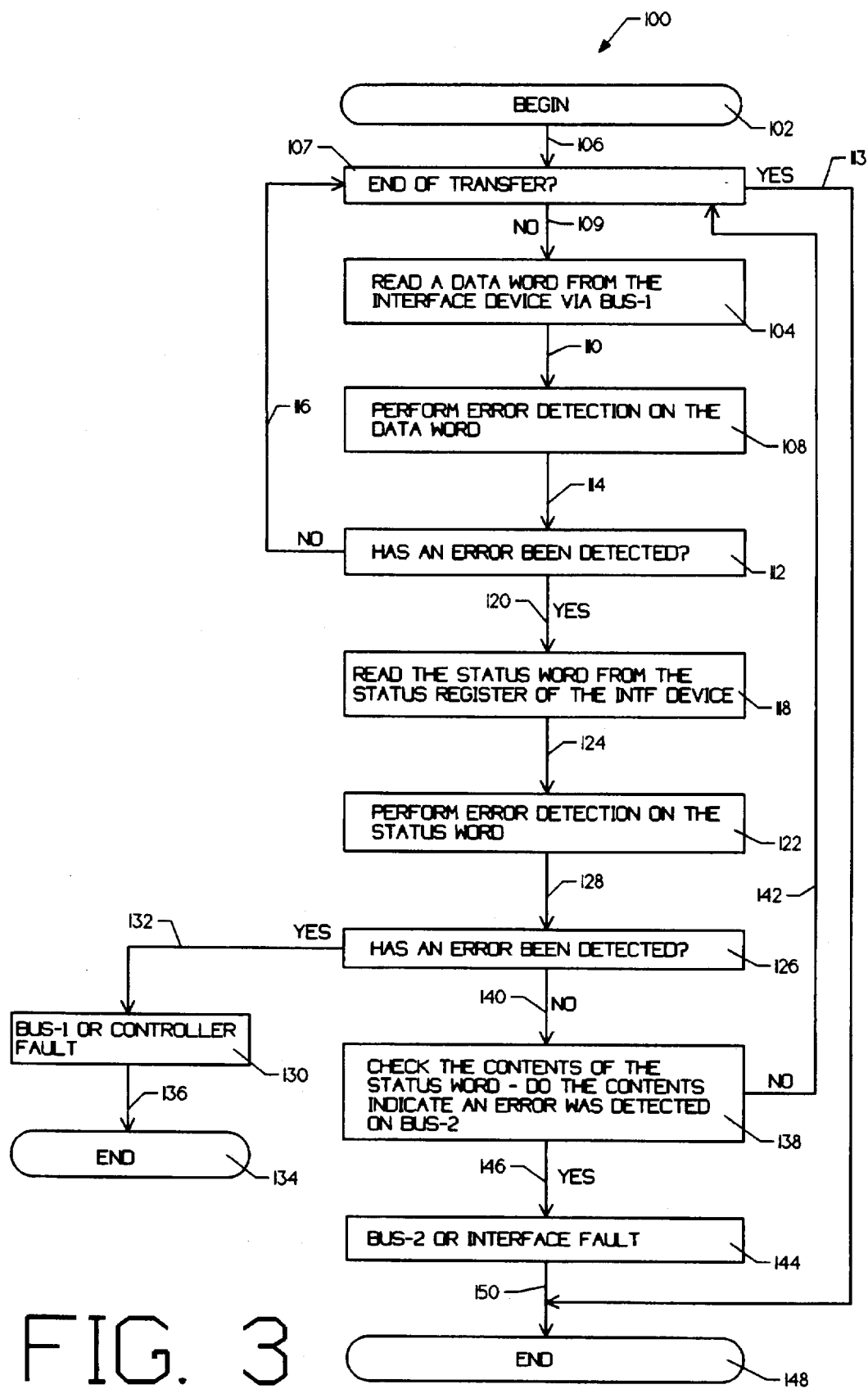
FIG. 3 is a flow diagram showing a first exemplary operation of the controller of FIG. 1.

FIG. 3 is a flow diagram showing a first exemplary operation of the controller of FIG. 1. The flow diagram is generally shown at 100. The algorithm is entered at element 102, wherein control is passed to element 107 via interface 106. Element 107 determines whether the transfer is complete. If the transfer is complete, control is passed to element 148 via interface 112, wherein the algorithm is existed. However, if the transfer is not complete, control is passed to element 104 via interface 109. Element 104 reads a data word from the interface device via bus-1. Control is then passed to element 108 via interface 110. Element 108 performs error detection on the data word. Control is then passed to element 112 via interface 114. Element 112 determines whether an error has been detected. If an error has not been detected, control is passed back to element 107 via interface 116. If an error has been detected, control is passed to element 118 via interface 120. Element 118 reads the status word from the status register of the interface device. Control is then passed to element 122 via interface 124. Element 122 performs error detection on the status word. Control is then passed to element 126 via interface 128. Element 126 determines whether an error has been detected in the status word. If an error has been detected in the status word, control is passed to element 130 via interface 132. Element 130 indicates that a bus-1 fault or a controller fault has occurred. Control is then passed to element 134 via interface 136, wherein the algorithm is ended.

Referring back to element 126, if an error has not been detected in the status word, control is passed to element 138 via interface 140. Element 138 checks the contents of the status word and determines whether an error was detected by the interface device on bus-2. If the contents do not indicate that an error was detected on bus-2, control is passed back to element 107 via interface 142. However, if the contents of the status register indicate that an error has detected on bus-2, control is passed to element 144 via interface 146. Element 144 indicates that a bus-2 fault or an interface device fault occurred. Control is then passed to element 148 via interface 150, wherein the algorithm is ended.

Figure 4A:
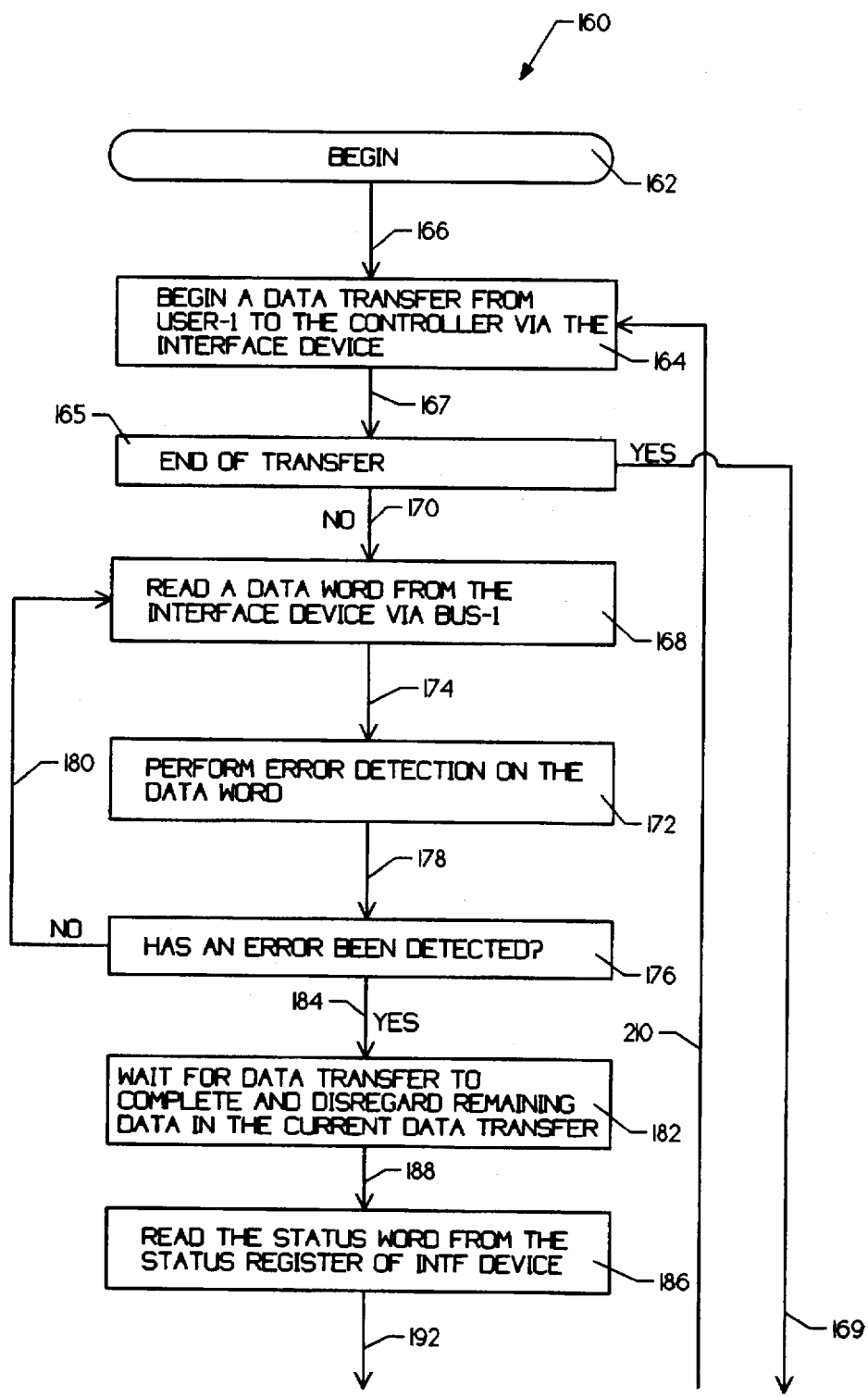
FIG. 4A and FIG. 4B comprise a flow diagram showing a second exemplary operation of the controller of FIG. 1.
Figure 4B:
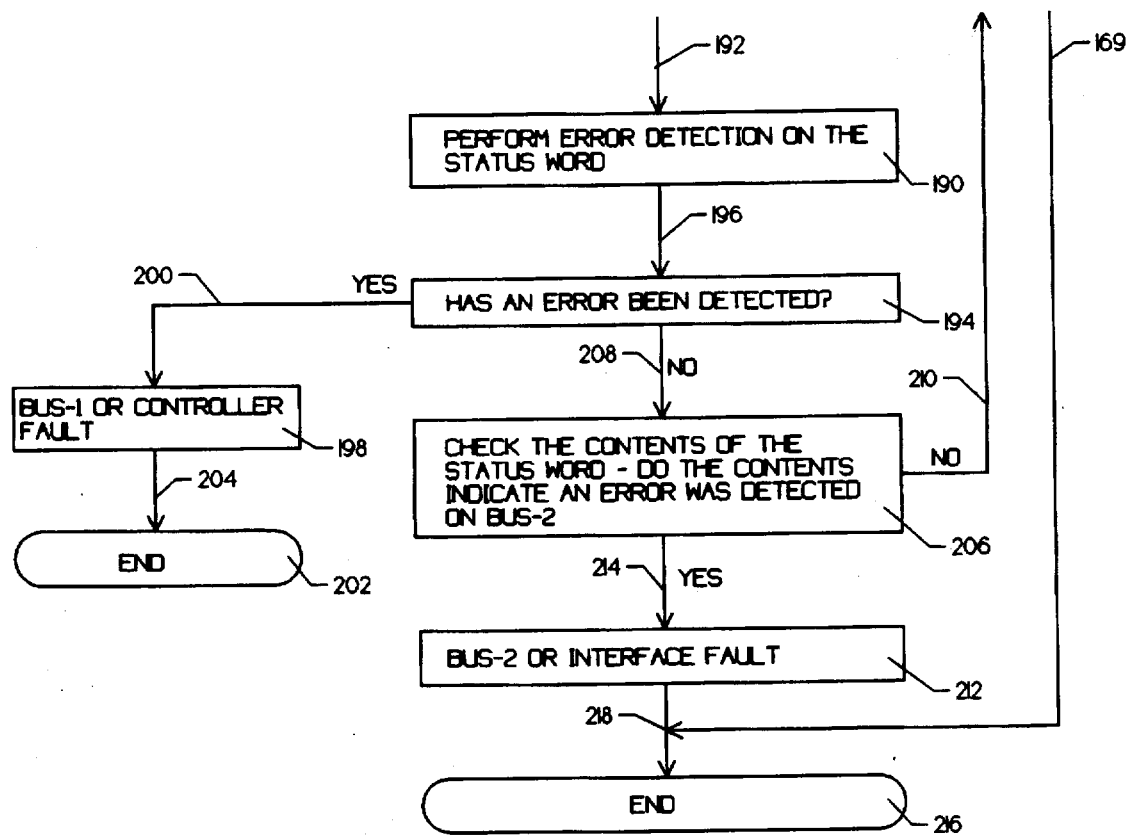

FIG. 4A and FIG. 4B comprise a flow diagram showing a second exemplary operation of the controller of FIG. 1. The flow diagram is generally shown at 160. The algorithm is entered at element 162, wherein control is passed to element 164 via interface 166. Element 164 begins a data transfer from the user-1 to the controller via the interface device. Control is then passed to element 165 via interface 167. Element 165 determines whether the transfer is complete. If the transfer is complete, control is passed to element 216 via interface 169 (see FIG. 4B), wherein the algorithm is existed. If the transfer is not complete, control is passed to element 168 via interface 170. Element 168 reads a data word from the interface device via bus-1. Control is then passed to element 172 via interface 174. Element 172 performs error detection on the data word. Control is then passed to element 176 via interface 178. Element 176 determines whether an error has been detected. If an error has not been detected, control is passed back to element 168 via interface 180. If an error has been detected, control is passed to element 182 via interface 184. Element 182 disregards any remaining data in the current data transfer and waits for the current data transfer to complete. Control is then passed to element 186 via interface 188. Element 186 reads the status word from the status register of the interface device. Control is then passed to element 190 via interface 192. Element 190 performs error detection on the status word. Control is then passed to element 194 via interface 196. Element 194 determines whether an error has been detected in the status word. If an error has been detected in the status word, control is passed to element 198 via interface 200. Element 198 indicates that a bus-1 fault or a controller fault has occurred. Control is then passed to element 202 via interface 204, wherein the algorithm is ended.

Referring back to element 194, if an error has not been detected in the status word, control is passed to element 206 via interface 208. Element 206 checks the contents of the status word and determines whether an error was detected by the interface device on bus-2. If the contents do not indicate that an error was detected by the interface device, control is passed back to element 164 via interface 210. However, if the contents of the status word do indicate that an error was detected by the interface device, control is passed to element 212 via interface 214. Element 212 indicates that a bus-2 fault or an interface device fault occurred. Control is then passed to element 216 via interface 218, wherein the algorithm is ended.

Figure 5:
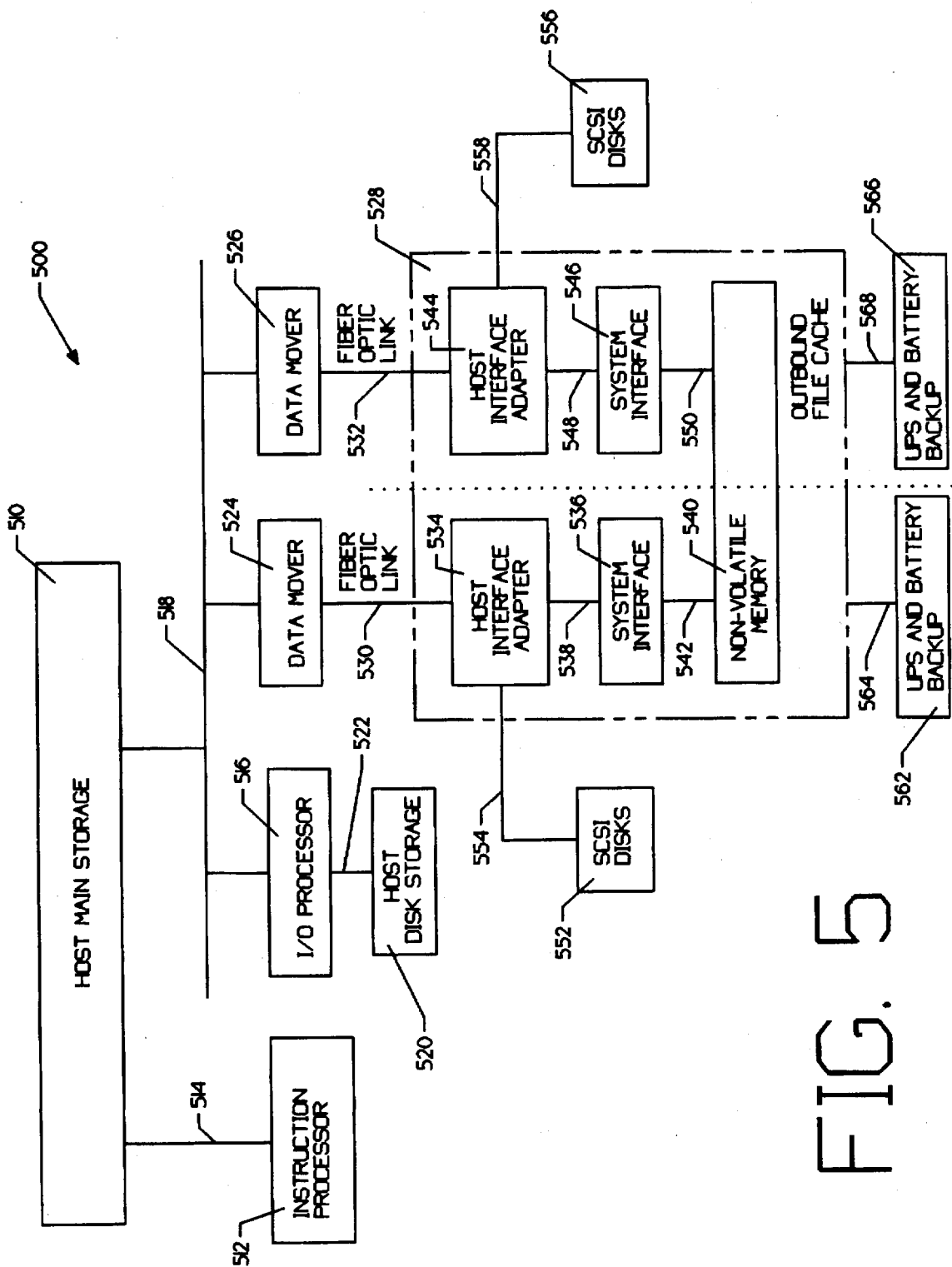
FIG. 5 is a block diagram of an exemplary computer system which may incorporate the present invention.

FIG. 5 is a block diagram of an exemplary computer system which may incorporate the present invention. The block diagram is generally shown at 500. The XPC comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degraded.

Power domain-A of outbound file cache 528 may comprise a host interface adapter 534, a system interface block 536, and a portion of a nonvolatile memory 540. Host interface adapter 534 may be coupled to data mover 524 via fiber optic link 530 and may further be coupled to system interface block 536 via interface 538. System interface block 536 may be coupled to nonvolatile memory 540 via interface 542, as described above. Similarly, host interface adapter 544 may be coupled to data mover 526 via fiber optic link 532 and may further be coupled to system interface block 546 via interface 548. System interface block 546 may be coupled to nonvolatile memory 540 via interface 550, as described above.

The data may be transferred from the host disk storage 520 through I/O processor 516 to host main storage 510. But now, any updates that occur in the data are stored in nonvolatile memory 540 instead of host disk storage 520, at least momentarily. All future references then access the data in nonvolatile memory 540. Therefore, nonvolatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the nonvolatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 may be coupled to host interface adapter 534 via interface 554. Similarly, data save disk system 556 may be coupled to host interface adapter 544 via interface 558. Data save disk systems 552 and 556 may comprise SCSI type disk drives and host interface adapters 534 and 544, respectively, may provide a SCSI interface thereto. In this configuration, the data elements stored in nonvolatile memory 540 may be downloaded directly to the data save disk systems 552 and 556. This may permit computer system 500 to detect a power failure in a power domain, switch to a corresponding backup power source 562 or 566, and store all of the critical data elements stored in nonvolatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 may only power a first portion of nonvolatile memory 540, host interface adapter 534, system interface 536, and data save disk system 552. Similarly, backup power source 566 may only power a second portion of nonvolatile memory 540, host interface adapter 544, system interface 546, and data save disk system 556. In this configuration, the remainder of computer system 500, including instruction processor 512, I/O processor 516, host main storage 510, and host disk storage 520, may not be powered after the primary power source fails. This may allow backup power sources 562 and 566 to remain active for a significantly longer period of time thereby allowing more data to be downloaded from nonvolatile memory 540. In this embodiment, host interface adapters 534 and 544 may have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from nonvolatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in nonvolatile memory 540 and thus may be appropriately sized.

In a preferred mode, once the data save operation has begun, it continues until all of the data in nonvolatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 6) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the nonvolatile memory 540 contents, and is used when there is only one Universal Power Source (UPS) 562 driving the outbound file cache 528 and data save disks. A redundant data save disk configuration may have two data save disk sets (as shown in FIG. 5) and may save two copies of the nonvolatile memory contents. In the redundant configuration, one set of data save disk drives may be powered from one UPS while the another set of data save disk drives may be powered by another UPS.

Figure 6:
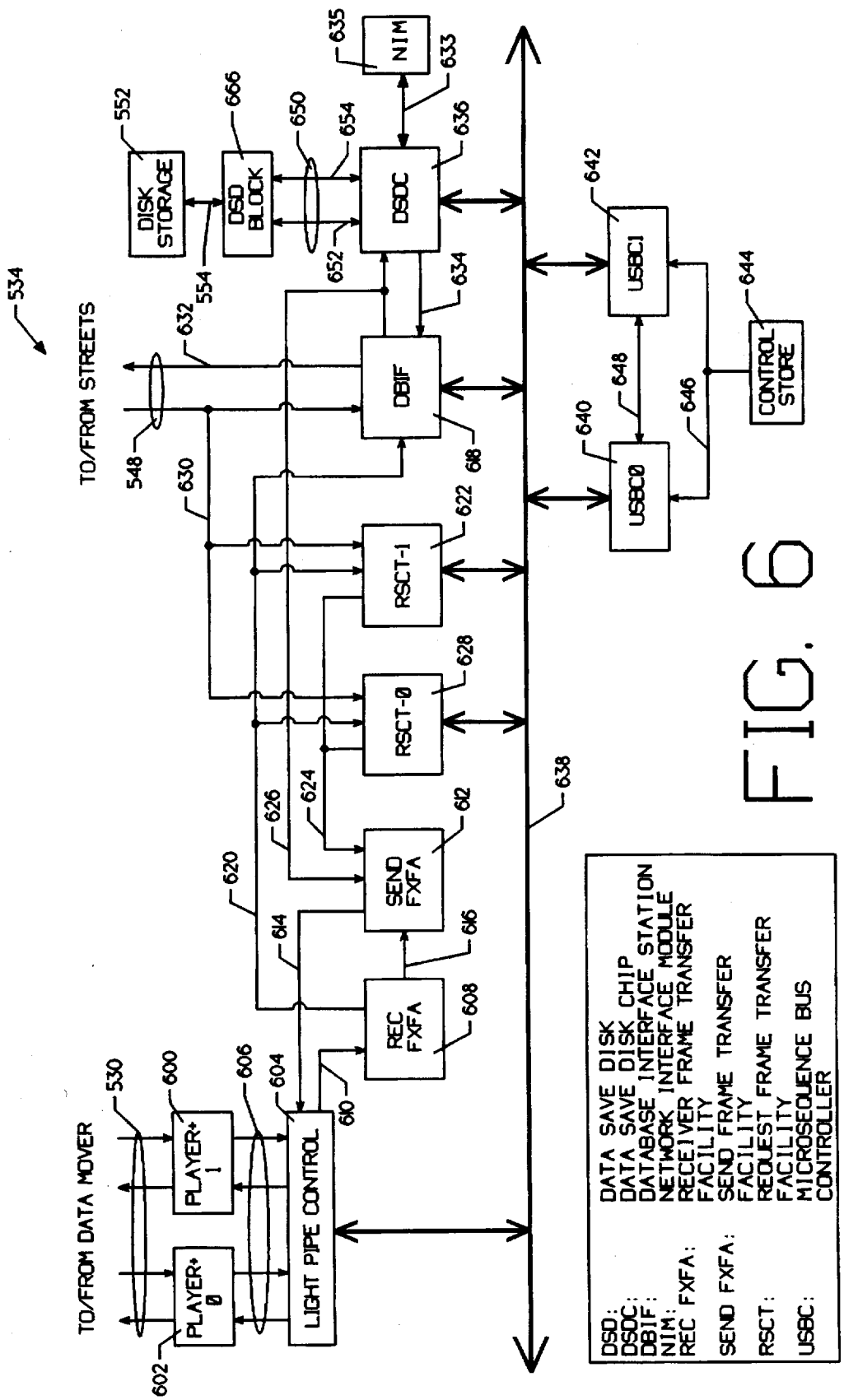
FIG. 6 is a schematic diagram of an exemplary embodiment of the host interface adapter block employing the present invention.

FIG. 6 is a schematic diagram of an exemplary embodiment of the host interface adapter block. For illustration, Host Interface Adapter (HIA) 534 of FIG. 5 is shown. It is recognized that HIA 544 may be similarly constructed. HIA 534 may comprise two Microsequencer Bus Controllers (USBC) 640, 642 which may be connected to a control store 644 via interface 646. The USBC's 640, 642 may access the HIA stations 628, 622, 618, and 636 via a micro bus 638. A player+0 602 and a player+1 600 may receive frames (or data elements) over fiber optic link 530. The term player+ refers to a fiber optic interface controller available from National Semiconductor which is called the Player Plus Chip Set. Player+0 602 may forward its frame to light pipe control 604 via interface 606. Similarly, player+1 600 may forward its frame to light pipe control 604 via interface 606. Light pipe control 604 may transfer the frames to a Receive Frame Transfer Facility (REC FXFA) 608 via interface 610. REC FXFA 608 may unpack the frames and may store control information in a Request Status Control Table-0 (RSCT-0) 628 and a RSCT-1 622 via interface 620. RSCT-0 628 and RSCT-1 622 may monitor the data that has been received from a corresponding data mover. The data which was contained in the frame received by REC FXFA 608 may be sent to the Database Interface (DBIF) station 618 via interface 620. DBIF 618 may forward the data over interface 632 to the streets.

Data received by the DBIF 618 from the streets via interface 548, may be sent to the Send Frame Transfer Facility (SEND FXFA) 612 via interface 626. Control information received via interface 630 may be sent to RSCT-0 628 and RSCT-1 622. SEND FXFA 612 may take the data and the control information provided by RSCT-0 628 and RSCT-1 622 via interface 624, and format a frame for transmission by light pipe control 604. Acknowledgements from REC FXFA 608 may be provided to SEND FXFA 612 via interface 616. The frame may be forwarded to light pipe control 604 via interface 614. Light pipe control 604 may create two copies of the frame received by SEND FXFA 612, and may provided a first copy to player+0 602 and a second copy to player+1 600 via interface 606. The frames may then be transmitted over the fiber optic links 530 to a corresponding data mover.

Referring back to control store 644, control store 644 may be used to store the instructions that are executed by USBC0 640 and USBC1 642. Control store 644, although in reality a RAM, is used as a read-only memory (ROM) during normal operation. Control store 644 may comprise seven (7) SRAM devices (not shown). Each SRAM device may hold 32*1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBC0 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBC0 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBC0 640 drives the data on the micro bus 638, but both master USBC0 640 and slave USBC1 642 drive address and control signals to lower the loading on micro bus 638. The slave USBC1 642 may send the result of each instruction to the master USBC0 640 via interface 648. The master USBC0 640 may then compare this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 may be coupled to micro bus 638 and may thus communicate with USBC0 640 and USBC1 642. DSDC 636 is further coupled to DBIF 618 via interfaces 634 and 626. DSDC may receive data elements from DBIF 618 via interface 626 and may provide data elements to DBIF 618 via interface 634. DSDC 636 is further coupled to a DSD block 666 via a DSD bus 650. In the exemplary embodiment, DSDC 636 may be coupled to DSD block 666 via a DSD address bus 652, a DSD data bus 654, and a number of control signals. DSD block 666 may be coupled to a data save disk system 552 via interface 554. DSD block may provide the interface function between DSDC 636 and data save disk system 552. A network interface module (NIM) 635 may be coupled to DSDC 636 via interface 633. NIM 635 may provide maintenance functions to DSDC 636, and to other elements within the system. USBC0 640 and USBC1 642 may control the operation of a download and/or upload operation between a nonvolatile memory 540 and data save disk system 552. This may include providing a timer function to delay the download and/or upload operation for a predetermined time period.

In this configuration, data save disk system 552 is directly coupled to nonvolatile memory 540 via DSD block 666, DSDC 636, DBIF 618, and system interface 536 (see FIG. 5). When a primary power source fails, the data elements stored in nonvolatile memory 540 may be downloaded directly to the data save disk system 552 without any intervention by an instruction processor 512 or I/O processor 516. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 may Upload the data elements directly to nonvolatile memory via DSD block 666, DSDC 636, DBIF 618, and system interface block 536, without any assistance from an instruction processor 512 or I/O processor 516. This may provide a high speed upload link between data save disk system 552 and nonvolatile memory 540.

Figure 7:
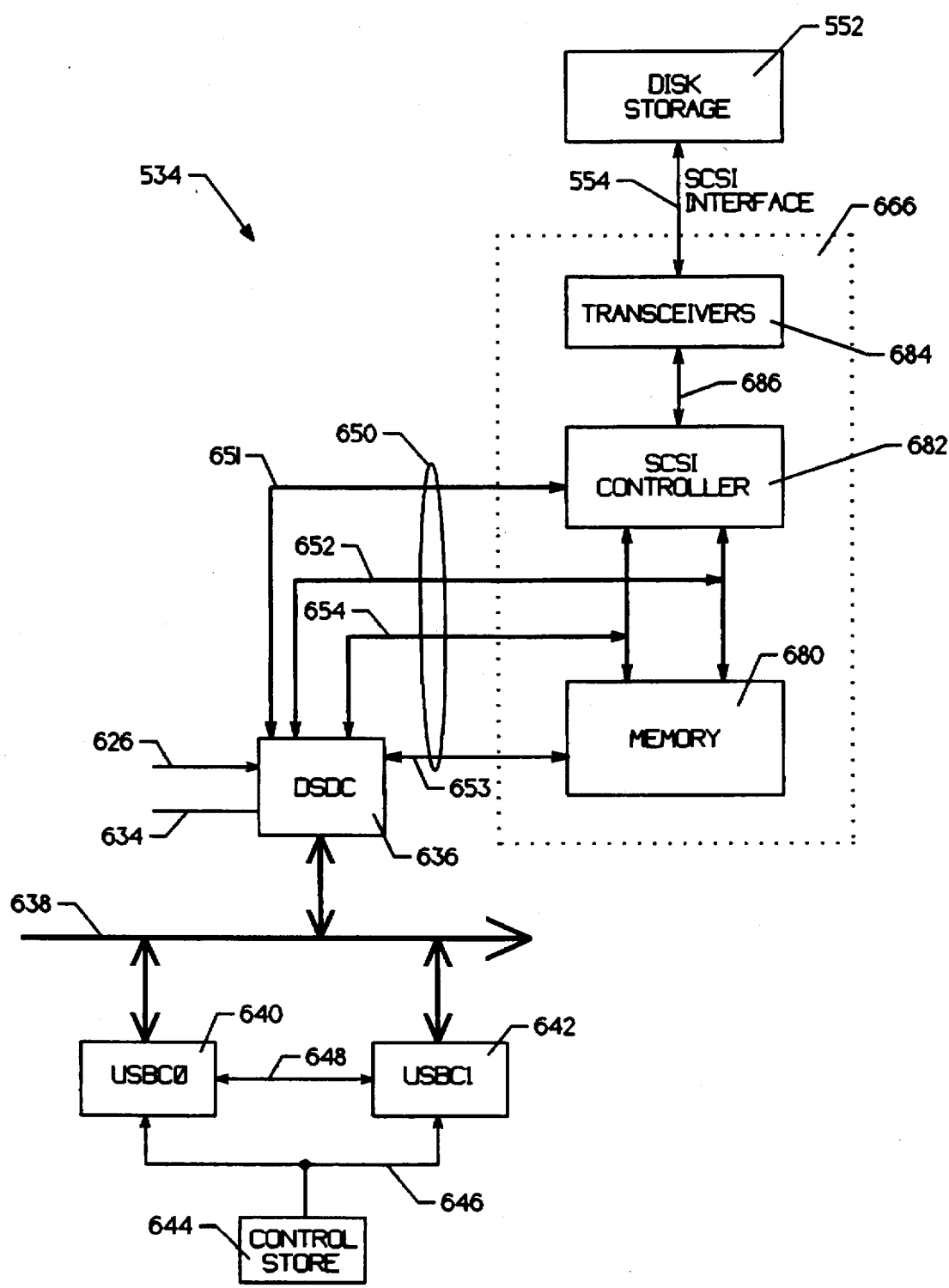
FIG. 7 is a partial schematic diagram of the host interface adapter block detailing the data save disk interface.

FIG. 7 is a partial schematic diagram of the host interface adapter block detailing the data save disk interface. DSD block 666 may comprise a memory 680, a disk controller 682, and a set of transceivers 684. A DSD bus 650 may couple DSDC 636, memory 680, and disk controller 682, and may comprise an address bus 652, and a data bus 654. DSD bus 650 may further comprise a number of disk controller control signals 651, and a number of memory control signals 653. DSD bus 650 may operate generally in accordance with a standard master/slave bus protocol wherein the DSDC 636, disk controller 682, and memory 680 may be slave devices, but only DSDC 636 and disk controller 682 may be master devices. That is, memory 680 may not be a master device in the exemplary embodiment.

Disk controller 682 may be coupled to transceivers 684 via interface 686. Transceivers 684 may be coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-Gbyte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 6, USBC0 640 and USBC1 642 may be coupled to MBUS 638. Further, USBC0 640 and USBC1 642 may be coupled to control store 644 via interface 646. DSDC 636 may be coupled to micro bus 638, DBIF 618, and DSD block 666.

Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBC0 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which may copy all of the data and control elements from nonvolatile memory 540 to data save disk system 552; (3) data restore operation which may copy all of the data and control elements from data save disk system 552 to nonvolatile memory 540; (4) checking the status of the disks in data save disk storage system 552 and informing maintenance if restore data exists thereon; and (5) various error detection and error handling subroutines.

As indicated above, USBC0 640 and USBC1 642 may read pointers and/or temporary data or the like from memory 680 through DSDC 636. To accomplish this, USBC0 640 and USBC1 642 may provide an address to DSDC 636 wherein DSDC 636 may arbitrate and obtain control of DSD bus 650. Once this has occurred, DSDC 636 may provide the address to memory 680. Memory 680 may then read the corresponding address location and provide the contents thereof back to DSDC 636 via DSD bus 650. DSDC 636 may then provide the pointers and/or temporary data or the like to USBC0 640 and USBC1 642 for processing. By using this protocol, USBC0 640 and USBC1 642 may obtain pointers and/or temporary data from memory 680 to control the operation of a download and/or upload operation between nonvolatile memory 540 and data save disk system 552. This may include providing a timer function to delay the download and/or upload operation for a predetermined time period.

Data save disk system 552 is directly coupled to nonvolatile memory 540 via DSD block 666, DSDC 636, DBIF 618, and system interface 536 (see FIG. 5). When a primary power source fails, and under the control of USBC0 640 and USBC1 642, DBIF 618 may read the data elements from nonvolatile memory via interface 630 wherein DBIF 618 may provide the data elements to DSDC 636 via interface 626. DSDC 636 may then perform arbitration for DSD bus 650, wherein the data elements may be read by disk controller 682. In this instance, disk controller 682 may be the bus master. Disk controller 682 may then provide the data elements to transceivers 684 wherein the data elements may be written to data save disk system 552. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, system interface 536, non-volatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 514. This may provide a high speed upload link between data save disk system 552 and nonvolatile memory 540.

Figure 8A:
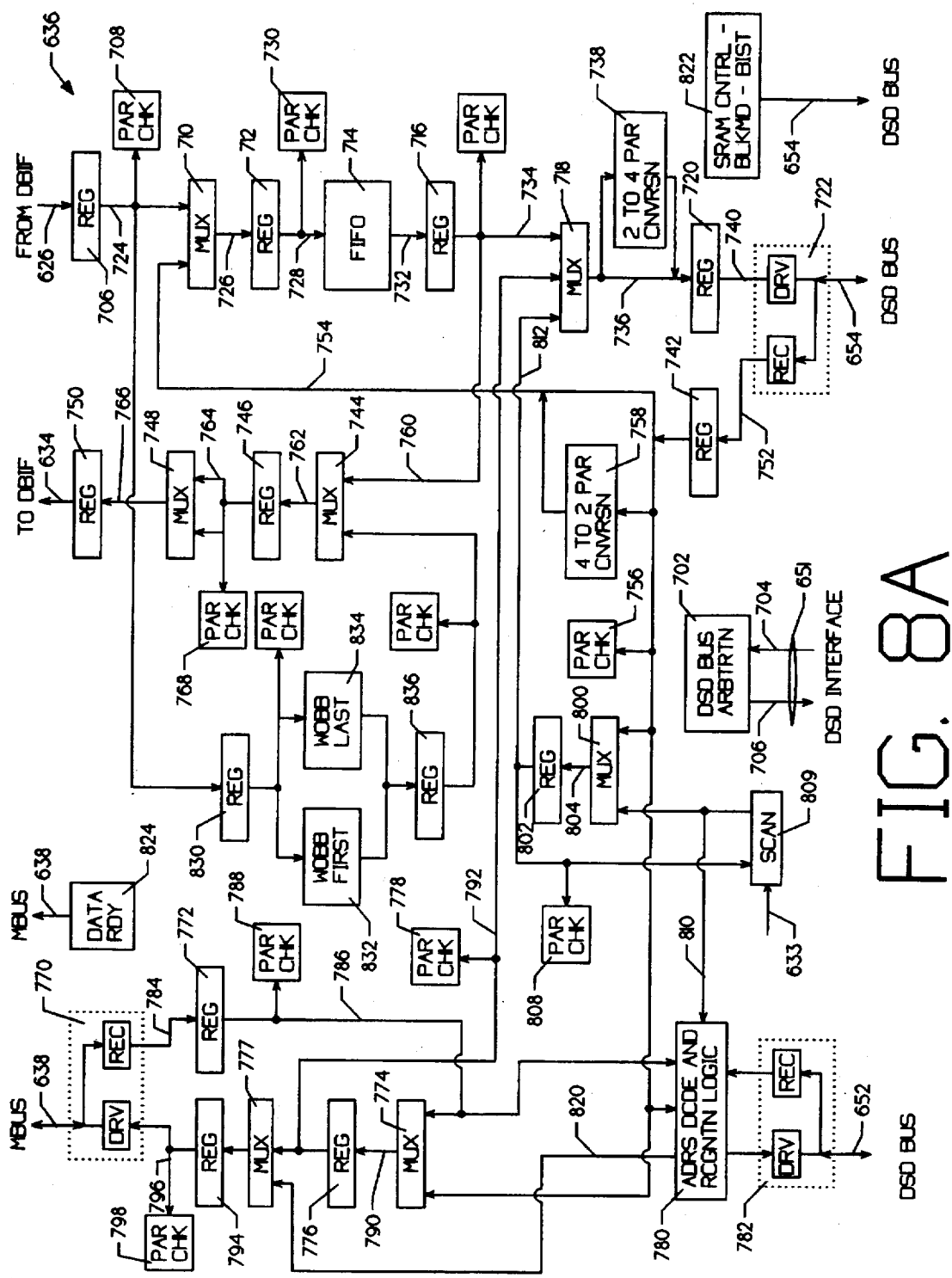
FIG. 8A is a block diagram of the Data Save Disk Chip (DSDC) shown in FIGS. 6–7.

FIG. 8A is a block diagram of the Data Save Disk Controller (DSDC) shown in FIGS. 6–7. The block diagram is generally shown at 636. DSDC 636 may comprise a DSD bus arbitration and control block 702 which may control the arbitration of DSD bus 650. DSD bus arbitration and control 702 may determine which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, may be as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, may be coupled to disk controller 682 via interface 651 (see FIG. 7). Interfaces 704 may be a bus request from disk controller 682 and interface 706 may be a bus acknowledge signal to disk controller 682.

In an exemplary embodiment, when disk controller 682 assumes bus mastership, it may relinquish bus ownership after a maximum of 16 bus cycles. Disk controller 682 may then wait 5 clock cycles before asserting a bus request to regain bus mastership. The 5 clock cycles provides a "fairness" delay to allow DSDC 636 to gain bus mastership if required.

DSDC 636 may comprise at least four basic data paths. A first basic data path may provide an interface between DBIF 618 and DSD bus 650. This path may comprise a register 706, a multiplexer 710, a register 712, a FIFO block 714, a register 716, a multiplexer 718, a data-out-register 720, and an I/O buffer block 722. Register 706 may receive data elements from DBIF 618 via interface 626. Register 706 may be coupled to multiplexer 710 via interface 724. Also coupled to interface 724 may be a parity check block 708. Parity Check block 708 may check the parity of a data element as it is released from register 706.

Multiplexer 710 may select interface 724 when transferring data between DBIF 618 and DSD bus 650. The data may then be provided to register 712 via interface 726 wherein register 712 may stage the data for FIFO 714. The data may then be provided to FIFO 714 via interface 728. Also coupled to interface 728 may be a parity check block 730. Parity Check block 730 may check the parity of a data element as it is released from register 712.

FIFO 714 may comprise a 34 bit by 64 word FIFO. FIFO 714 may function as a buffer between DBIF 618 and DSD bus 650. This may be desirable because disk controller 682 may have to arbitrate for DSD bus 650, thus causing an unpredictable delay. FIFO 714 may store the data that is transferred by DBIF 618 to DSDC 636 until disk controller 682 is able to gain control of DSD bus 650. Once disk controller 682 gains access to DSD bus 650, FIFO 714 may wait for eight (8) words to be transferred from DBIF 618 to FIFO 714 before sending the data over DSD bus 650.

Once released by FIFO 714, the data may be provided to register 716 via interface 732. Register 716 may store the output of FIFO 714. The data may then be provided to multiplexer 718 via interface 734. Multiplexer 718 may select interface 734 when transferring data between DBIF 618 and DSD bus 650. The data may then be provided to data-out-register 720 via interface 736, wherein data-out-register 720 may stage the data for I/O buffer block 722. Parity conversion block 738 may provide a two to four bit parity conversion. That is, data arriving from DBIF 618 via multiplexer 718 may only have two parity bits associated therewith. It may be desirable to convert the two parity bits to a four parity bit scheme. Data-out-register 720 may then provide the data to I/O buffer block 722 via interface 740. I/O buffer block 722 may comprise a plurality of bi-directional transceivers wherein each of the transceivers may be enabled to drive the data onto DSD bus 650 via interface 654.

A second basic data path of DSDC 636 may provide an interface between DSD bus 650 and DBIF 618. This path may comprise I/O buffer block 722, a data-in-register 742, multiplexer 710, register 712, FIFO block 714, register 716, a multiplexer 744, a register 746, a multiplexer 748, and a register 750. For this data path, I/O buffer block 722 may be enabled to accept data from DSD bus 650 and provide the data to data-in-register 742 via interface 752. Data-in-register 742 may provide the data to multiplexer 710 via interface 754. Also coupled to interface 754 may be a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 may select interface 754 when transferring data between DSD bus 650 and DBIF 618. The data may then be provided to register 712 via interface 726 wherein register 712 may stage the data for FIFO 714. The data may then be provided to FIFO 714 via interface 728. Also coupled to interface 728 may be parity check block 730. Parity Check block 730 may check the parity of a data element as it is released from register 712.

FIFO 714 may function as a buffer between DSD bus 650 and DBIF 618. This may be desirable because DBIF 618 may have to wait to gain access to the streets via interface 632. FIFO 714 may store data that is transferred by DSD bus 650 until DBIF 618 can gain access to the streets.

Once released by FIFO 714, the data may be provided to register 716 via interface 732. Register 716 may store the output of FIFO 714. The data may then be provided to multiplexer 744 via interface 760. Multiplexer 744 may select the data provided by register 716 during a data transfer between DSD bus 650 and DBIF 618. Multiplexer 744 may then provide the data to register 746 via interface 762. Register 746 may then provide the data to multiplexer 748 via interface 764. Multiplexer 748 may select 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 may then provide the data to register 750. Register 750 may provide the data to DBIF 618 via interface 634.

A third basic data path of DSDC 636 may provide an interface between MBUS 638 and DSD bus 650. This path may comprise a I/O buffer block 770, a register 772, an address decode and recognition logic block 780, a multiplexer 774, a register 776, multiplexer 718, data-out-register 720, and I/O buffer block 722. For this data path, USBC's 640, 642 may provide a request to DSDC 636 via MBUS 638. The request may comprise a data word, an address, and/or a number of control signals. In the exemplary embodiment, a request comprising an address and a number of control signals may be provided over MBUS 638 first wherein a data word may follow on MBUS 638, if appropriate. I/O buffer block 770 may receive the request via interface 638 and may provide the request to register 772 via interface 784. Register 772 may provide the request to multiplexer 774 and to an address decode and recognition block 780 via interface 786. Also coupled to interface 786 may be a parity check block 788. Parity Check block 788 may check the parity of the request as it is released from register 772. Multiplexer 774 may select interface 786 during transfers from MBUS 638 to DSD bus 650. Multiplexer 774 may provide the request to register 776 via interface 790. Register 776 may then provide the request to multiplexer 718 via interface 792. Also coupled to interface 792 may be a parity check block 778. Parity Check block 778 may check the parity of the request as it is released from register 776.

Multiplexer 718 may select interface 792 when transferring data between MBUS 618 and DSD bus 650. Multiplexer 718 may provide the data word to data-out-register 720 via interface 736 wherein data-out-register 720 may stage the data word for I/O buffer block 722. Parity conversion block 738 may provide a two to four bit parity conversion. That is, data arriving from MBUS 638 via multiplexer 718 may only have two parity bits associated therewith. It may be desirable to convert the two parity bits to a four parity bit scheme. Data-out-register 720 may then provide the data word to I/O buffer block 722 via interface 740. I/O buffer block 722 may be enabled to drive the data word onto DSD bus 650 via interface 654.

A fourth basic data path of DSDC 636 may provide an interface between DSD bus 650 and MBUS 638. This path may comprise I/O buffer block 722, data-in-register 742, parity conversion block 758, multiplexer 774, a multiplexer 777, register 776, a register 794, and I/O buffer block 770.

I/O buffer block 722 may receive a data element from DSD bus 650. In an exemplary embodiment, the data element may comprise pointers and/or temporary data requested by USBC0 640 or USBC1 642 from memory 680. I/O buffer block 722 may provide the pointers and/or temporary data to data-in-register 742 via interface 752. Data-in-register 742 may provide the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 may select interface 754 when transferring data between DSD bus 650 and MBUS 638. Multiplexer 774 may then provide the pointer and/or temporary data to register 776 via interface 790. Register 776 may provide the pointers and/or temporary data to multiplexer 777 via interface 792. Multiplexer 777 may select interface 792 when transferring data between DSD bus 650 and MBUS 638. Multiplexer 777 may provide the pointers and/or temporary data to register 794. Register 794 may provide the pointers and/or temporary data to I/O buffer block 770 via interface 796. Also coupled to interface 796 may be a parity check block 798. Parity Check block 798 may check the parity of the data as it is released from register 794. I/O buffer block 770 may provide the pointers and/or temporary data to USBC0 640 or 642 via MBUS 638.

USBCs 640 and 642 do not interface directly with DSD bus 650 but rather may access memory 680 and disk controller 682 indirectly using registers in DSDC 636. For example, when USBC0 640 performs a read of memory 680, it initiates the transfer by writing a DSDC register 772 with the requested address. Register 772 may provide the address to address recognition logic block 780 via interface 786. The address may then be provided to register 773 (see FIG. 8B). Register 773 may then provide the address to multiplexer 852. Multiplexer 852 may select the output of register 773 when transferring an address from USBC0 640 to memory 680. Multiplexer 852 may then provide the address to address register 856 via interface 858.

DSDC 636 then performs bus arbitration, and provides the address to memory 680 via I/O transceiver block 782. Memory 680 then provides the requested data on DSD bus 650. DSDC 636 may then read the data on DSD bus 650 and provide the result to MBUS 638. Referring to FIG. 8A, register 742 may receive the read data word and may provide the read data word to multiplexer 774 via interface 754. Multiplexer 774 may then provide the read data word to register 776 wherein register 776 may provide the read data word to multiplexer 777. Multiplexer 777 may then provide the read data word to register 794 wherein the read data word may be provided to USBC0 640 via I/O buffer 770. Depending on whether an address or a data word is provided by USBC0 640 via MBUS 638, the corresponding address or data element may be routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 8B) within address decode and recognition logic block 780 via interface 810. Register 851 may provide the address to address output register 856 via multiplexer 852.

For a dynamic read operation of memory 680, the address may be an initial read address which may be scanned into dynamic scan register 809 as described above. Thereafter, the address may be automatically incremented by an auto-increment block 826 (see FIG. 8B) such that a number of successive read operations may be made to memory 680. After the initial address is provided, NIM 635 may provide a control word to dynamic scan register 809. The control word may comprise a word count and a function code. For a read operation, the function code may indicate a read function. The word count may be latched into a word count register 853 (see FIG. 8B) wherein after each read operation, the word count register may be decremented. When the word count register reaches a value of zero, DSDC 636 may terminate the above referenced read operation. For each read operation performed, the resulting data may be latched into data-in-register 742. A multiplexer 800 may then select interface 754 thereby storing the resulting data into register 802. The data may then be provided to dynamic scan register 809 via interface 812. The resulting data may then be scanned out of dynamic scan register 809 via NIM 635 for analysis.

For a write operation, the address may be an initial write address and function code which may be scanned into dynamic scan register 809 as described above. Thereafter, the address may also be automatically incremented by an auto-increment block 826 (see FIG. 8B) such that a number of successive write operations may be made to memory 680. For a write operation, the function code may indicate a write function. For each write operation performed, a corresponding data word may be scanned into dynamic scan register 809. The data word may be provided to multiplexer 800 wherein multiplexer 800 may provide the data word to register 802. Register 802 may provide the data word to multiplexer 718 via interface 812. Multiplexer 718 may provide the data word to data-out-register 720 via interface 736 wherein data-out-register 720 may stage the data word for I/O buffer block 722. Data-out-register 720 may then provide the data word to I/O buffer block 722 via interface 740. I/O buffer block 722 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file may comprise a plurality of segments and each of the plurality of segments may comprise a plurality of blocks. Each of the blocks may comprise a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 may support the partial block update function of the host interface adapter 534. A further discussion of the partial block update function may be found in the above referenced co-pending patent application Ser. No. 08/172,663, which is incorporated herein by reference.

SRAM control-block mode-and bist block 822 may provide a number of functions. For example, SRAM control-block mode-and bist block 822 may provide a number of control signals to memory 680 via interface 653. Other exemplary function may be to provide error detection and test to memory 680.

Finally, DSDC 636 may provide a data ready block 824 which may be coupled to MBUS 638. Data ready block 824 may indicate to USBC 640,642 when a corresponding read operation has been completed by DSDC 636.

Figure 8B:
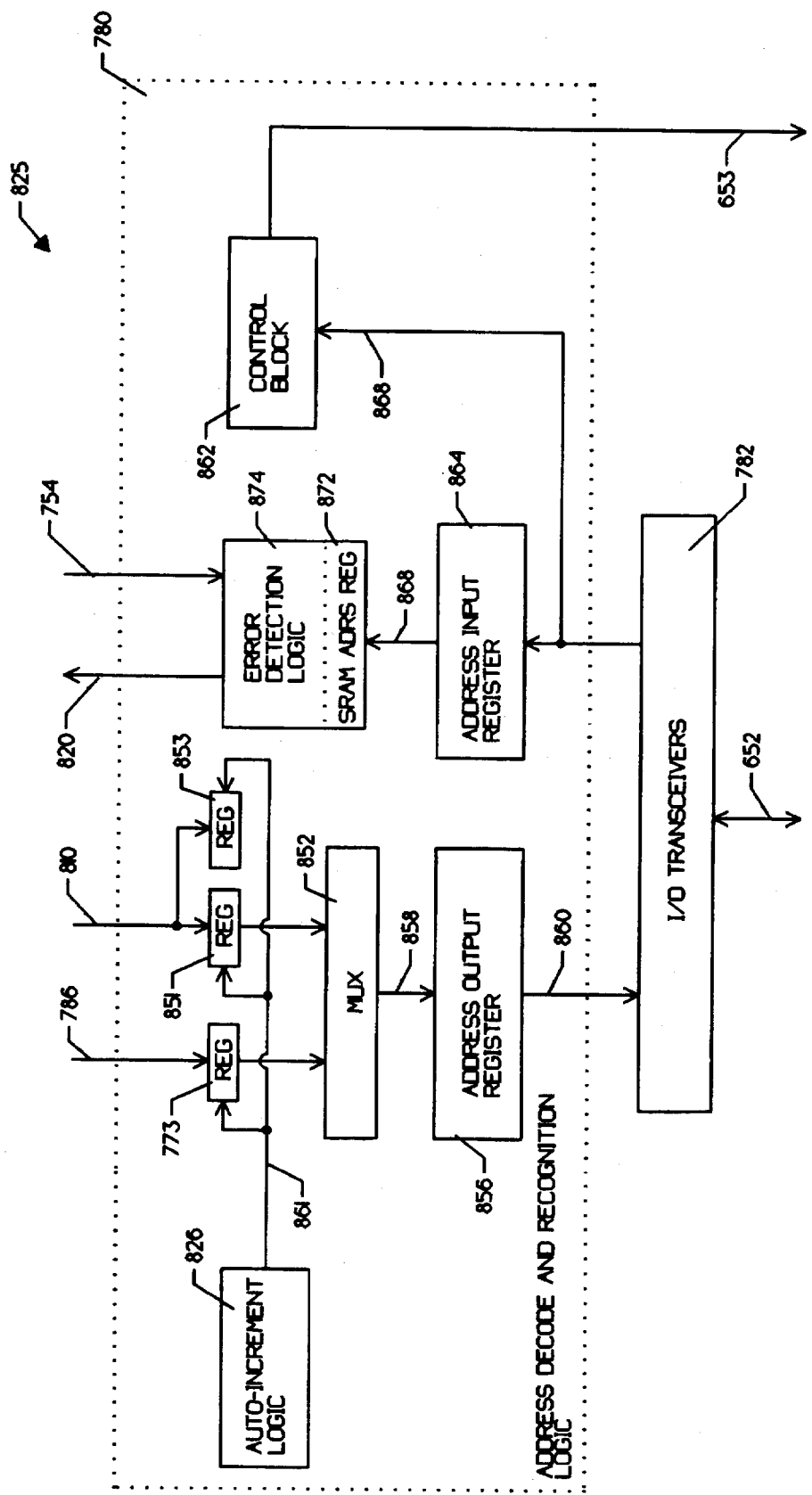
FIG. 8B is a block diagram showing applicable portions of the Address and Recognition Logic block of FIG. 8A.

FIG. 8B is a block diagram showing applicable portions of the Address and Recognition Logic block of FIG. 8A. The block diagram is generally shown at 825. In the exemplary embodiment, Address and Recognition Logic block 780 may comprise an address output register 856 and an address input register 864. Address output register 856 may be coupled to an outgoing port of I/O buffer block 782 via interface 860. Similarly, address input register 864 may be coupled to an in-going port of I/O buffer block 782 via interface 868.

An address may be provided to register 773 by MBUS 638 via interface 786, as described above. Further, an address may be provided to register 851 by dynamic scan register 809 via interface 810, as described above. When MBUS 638 is providing an address to DSD address bus 652, multiplexer 852 may select the output of register 773. Similarly, when NIM 635 is providing an address via dynamic scan register 809, multiplexer 852 may select the output of register 851. Multiplexer 852 may provide the selected address to address output register 856 via interface 858. Address output register 856 may provide the address to DSD address bus 652 via I/O buffer block 782.

Address recognition block 780 may determine if a request on interface 786 comprises an address. If the request comprises an address, corresponding control signals provided by register 772 via interface 786 may determine the appropriate format thereof. For example, one format for an address may indicate that the present address should be loaded, but each address thereafter should be generated by an automatic increment block 826 (see FIG. 10). Address recognition logic block 780 may make this determination and alert auto-increment block 826. Auto-increment block 826 may thereafter automatically increment and/or decrement the value in registers 773, 851, or 853 via interface 861.

Address input register 864 may be coupled to DSD address bus 652 via I/O buffer block 782. Address input register 864 may latch the contents of DSD address bus 652 and monitor the contents thereof. Address input register 864 may be coupled to a control block 862 via interface 869. Control block 862 may monitor the DSD address via the address input register 864 and provide appropriate control signals to DSD bus 650 via interfaces 651 and 653. In the exemplary embodiment, control block 862 may provide control signals that memory 680 and disk controller 682 may not otherwise provide. For example, control block 862 may provide four (4) byte enable signals, and a read/write enable signal (see FIG. 9A-9B) to memory 680 via interface 653. Also, the NCR53C720 SCSI controller 682 requires a ready-in signal to be asserted by a slave device indicating that the slave device is ready to transfer data. DSDC ASIC 636 may provide the ready-in signal to NCR53C720 SCSI controller 682 via interface 651 for both DSDC 636 and memory 680.

Finally, an error detection logic block 874 may be coupled to address input register 864 via interface 869. Error detection logic block 874 may comprise an SRAM address register 872. SRAM address register 872 may capture an SRAM address when an SRAM read error is detected. That is, SRAM address register 872 may store the read address that is present on DSD address bus 650 in response to an SRAM read error. Error detection block 874 may monitor the data that is present in DSD bus 650 via interface 754.

Error detection block 874 may thus perform a parity check or the like on the data presently read from memory 680. If an error exists, error detection block 874 may enable SRAM address register thereby capturing the current read address. This may identify the faulty read address within memory 680. Error detection block 874 may then provide the faulty read address to USBC0 640 for further processing via interface 820. For example, USBC0 640 may read and write various test patterns to the faulty read address to determine if the fault was caused by a soft error or a hard error. If the fault was caused by a soft error, the contents of memory 680 may be reloaded and the operation of the computer system may continue. However, if the fault was caused by a hard error, the operation of the computer system may be interrupted. Other error detection schemes are contemplated and may be incorporated into error detection block 874.

FIGS. 9A–9B comprise a table illustrating an exemplary bus description of the DSD bus of FIG. 7. The table is generally shown at 900. DSD bus 650 may comprise a number of fields. The type of fields can be generally broken down into data fields, address fields, parity fields, and control fields. The fields for an exemplary embodiment of DSD bus 650 are described below.

DSD bus 650 may comprise a 32 bit data bus as shown at 902. The 32 bit data bus is a hi-directional data bus and may serve as the main data path for all operations. The 32 bit data bus may be asserted by a bus master for write operations and a bus slave for read operations.

DSD bus 650 may further comprise a 4 bit data parity bus as shown at 904. Each of the four parity bits may correspond to predetermined data bits of 32 bit data bus 902. The 4 bit data parity bus may be used for error detection and correction purposes.

DSD bus 650 may further comprise a 30 bit address bus as shown at 906. The 30 bit address bus is a hi-directional address bus and may serve as the main address path for all operations. The 30 bit address bus may be asserted by a bus master.

DSD bus 650 may further comprise an address status line (ADS\) as shown at 908. The address status line may be active low and when asserted by a bus master, may indicate that the value on the 30 bit address bus 906 are valid. In an exemplary mode, the address status line may be asserted to indicate a start of a bus cycle.

DSD bus 650 may further comprise a write/read line (W-R\) as shown at 910. The write/read line may be active low and may indicate the direction of the data transfer relative to the bus master. The write/read line may be driven by the bus master.

DSD bus 650 may further comprise a hold line as shown at 912. The hold line may be asserted by the disk controller 682 to request bus mastership. The hold line may be active low and may be provided by the NCR53C720 SCSI I/O processor 682.

DSD bus 650 may further comprise a hold acknowledge (HLDAI\) line as shown at 914. The hold acknowledge line may be asserted by DSD bus arbitration logic 786 to indicate that the previous bus master has relinquished control of the DSD bus 650. The hold acknowledge line may be active low.

DSD bus 650 may further comprise a bus clock (BCLK) line as shown at 916. The bus clock signal may control the DMA portion of the NCR53C720 SCSI I/O processor 682. The bus clock may be provided by DSDC 636.

DSD bus 650 may further comprise a chip reset line as shown at 918. The chip reset line may be active low and may force a synchronous reset of the NCR53C720 SCSI I/O processor 682. In the exemplary embodiment, the chip reset line may be asserted by DSDC 636 for a minimum of 15 bus cycles.

DSD bus 650 may further comprise a chip select (CS\) line as shown at 920. The chip select line may select the NCR53C720 SCSI I/O processor 682 as a slave device. In the exemplary embodiment, the chip select line may be active low and may be connected to address bit 6 of the 30 bit address bus discussed above.

DSD bus 650 may further comprise an interrupt (IRQ\) line as shown at 922. The interrupt line may be active low and may indicate that service is required from USBC0 640 and/or USBC1 642.

Referring to FIG. 9B, DSD bus 650 may further comprise four byte enable (BE) lines as shown at 924, 926, 928, and 930. Each of the bus enable lines may be active low and each may be asserted by the bus master. A first byte enable line (BE0) may enable the transfer of data over data bus lines 24–31. A second byte enable line (BE1) may enable the transfer of data over data bus lines 16–23. A third byte enable line (BE2) may enable the transfer of data over data bus lines 8–15. Finally, a fourth byte enable line (BE3) may enable the transfer of data over data bus lines 0–7.

DSD bus 650 may further comprise a ready-in (READYI\) line as shown at 932. The ready-in line may be provided by the slave device to the master device indicating that the slave device is ready to transfer data to the master device. The ready-in line may be active low and may be provided by DSDC 636 even if DSDC 636 is not the master of the bus.

DSD bus 650 may further comprise a ready-out (READYO\) line as shown at 934. The ready-out line may be asserted to indicate the end of a slave cycle. In the exemplary embodiment, the ready-out line may be active low and may be provided by disk controller 682 to terminate a slave cycle.

DSD bus 650 may further comprise a master line as shown at 936. The master line may be asserted by the NCR53C720 I/O processor 682 to indicate it has become bus master. The master line may be active low.

DSD bus 650 may further comprise a bus mode select (BS) bus as shown at 938. The bus mode select bus may select the bus mode and addressing mode of the NCR53C720 I/O processor 682. In the exemplary embodiment, the bus mode select bus is set to "010" thereby selecting a 80386DX like bus mode (bus mode 4) and the big endian addressing mode.

Finally, DSD bus 650 may further comprise a scripts autostart mode (AUTO\) line at shown at 940. The scripts autostart mode line selects either auto or manual scritps start mode. Script routines may be stored in memory 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 7, a number of control signals may be provided between DSDC 636 and disk controller 682 via interface 651. These signals may include the signals shown at 906, 908, 910, 912, 914, 916, 918, 920, 922, 932, 934, 936, and 938. Similarly, a number of control signals may be provided between DSDC 636 and memory 680 via interface 653. These signals may include a memory read/write enable signal and the four byte enable signals shown at 924, 926, 928 and 930.

Figure 10:
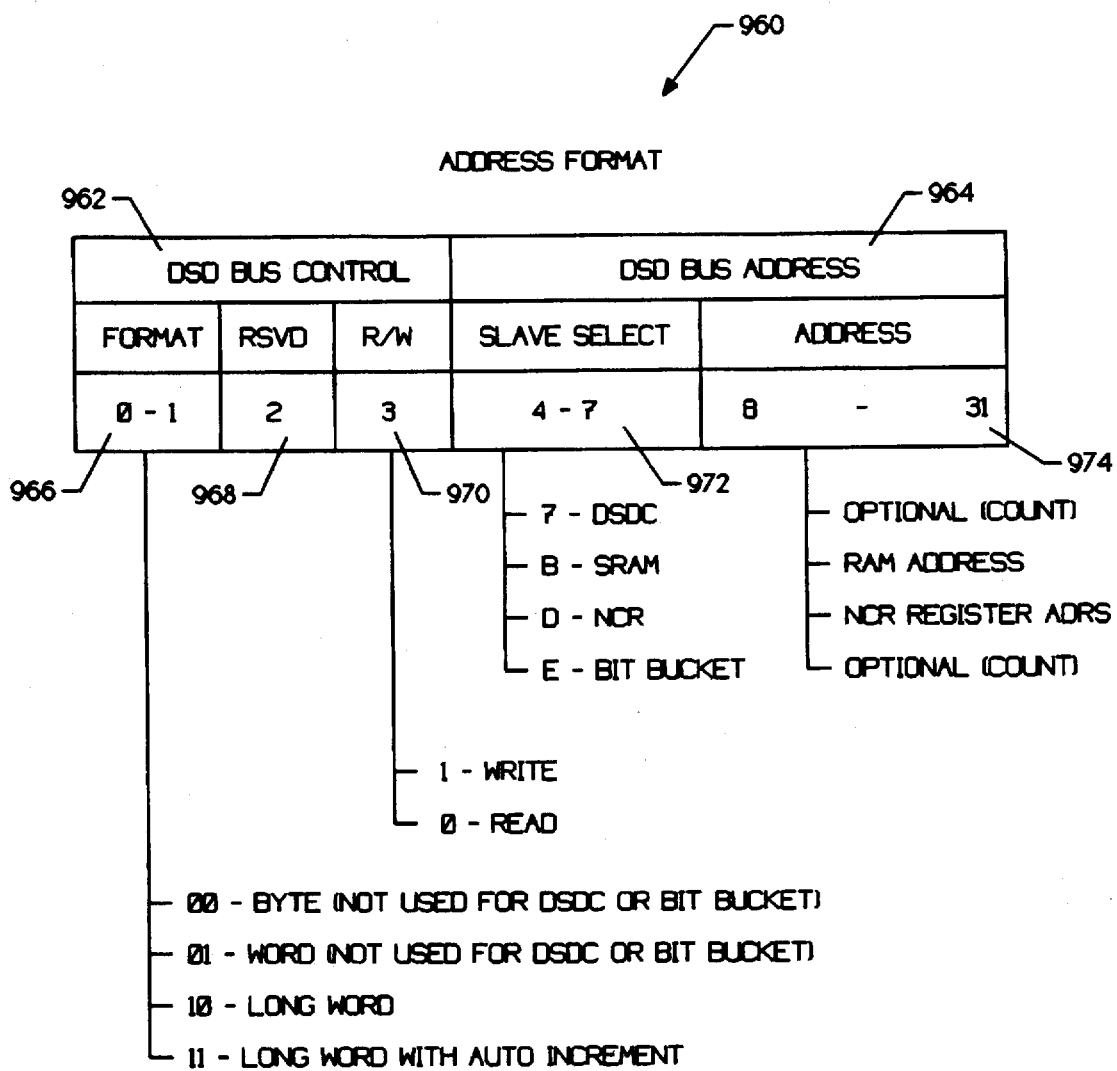
FIG. 10 is a table illustrating an exemplary address format for the address field of the DSD bus of FIG. 7.

FIG. 10 is a table illustrating an exemplary address format for the address field of the DSD bus of FIG. 7. The table is generally shown at 960. The address format of the address field of DSD bus 650 may comprise DSD bus control signals 962 and DSD bus address signals 964. The DSD bus control signals may comprise a format field 966, a reserved field 968, and a read/write field 970. The DSD address signals may comprise a slave select field 972 and an address field 974.

The format field 966 may specify the format of a corresponding address. For example, the format field may specify the format of a corresponding address as a long word or a long word with auto increment. The auto increment option is further discussed above with reference to FIG. 8A and FIG. 8B. The read/write field 970 may indicate whether the corresponding address is requesting a read or write operation.

The slave select field 972 may indicate which of the three devices attaches to DSD bus 650 is to be the slave. That is, if DSDC 636 has bus mastership and is providing the address, the slave select field may indicate whether NCR53C720 682 or memory 680 is to be the slave. Finally, the address field 974 provides a valid address to the selected slave device. That is, if memory 680 is the slave device, the address field 974 may provide a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 may be decoded to provide the bi-directional byte enable signals 924, 926, 928, and 930 as shown in FIG. 9B.

Figure 11:
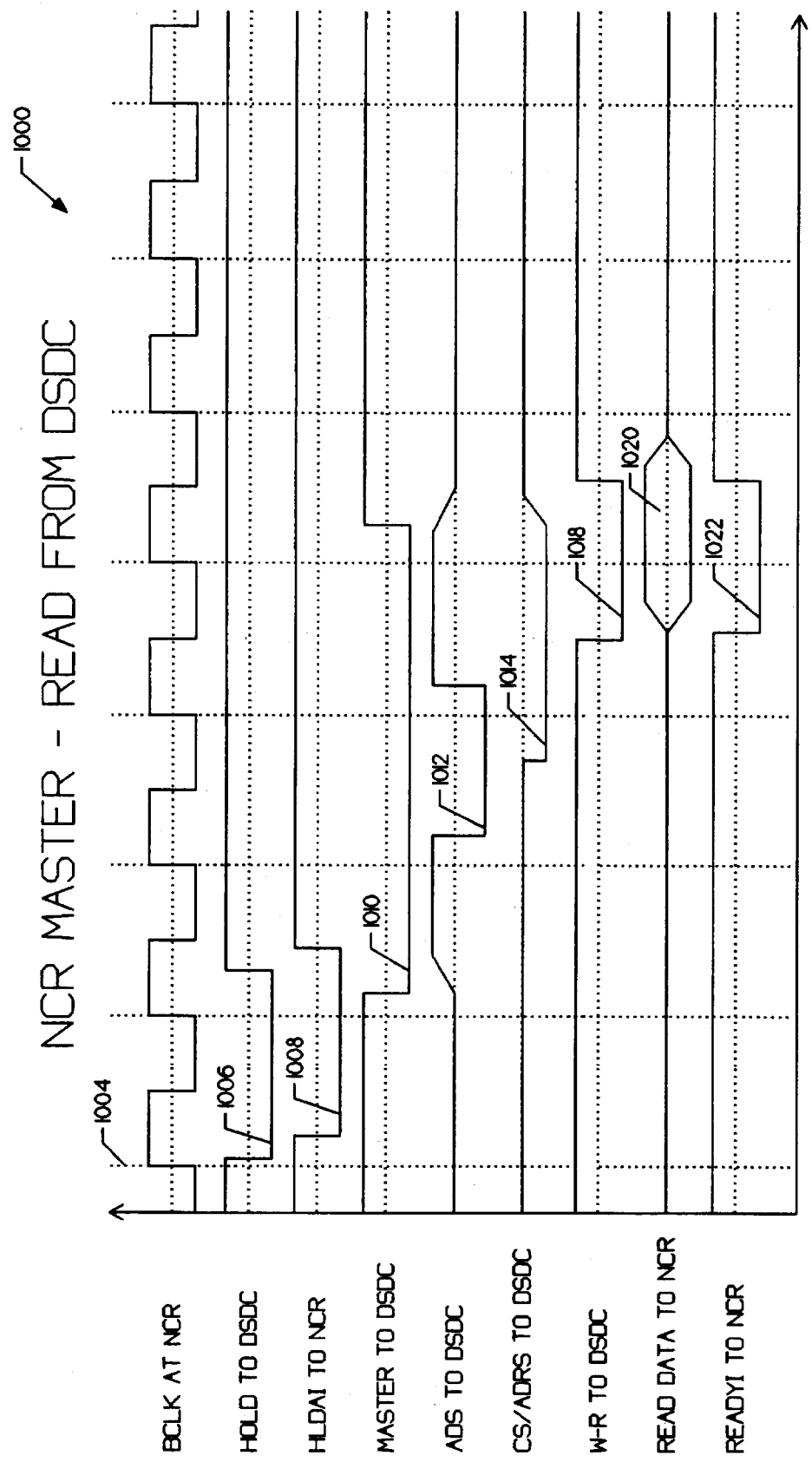
FIG. 11 is a timing diagram illustrating an exemplary read cycle on the DSD bus wherein the NCR chip is the master and the DSDC device is the slave.

FIG. 11 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the hi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices may be the bus slave, and is either the source (read) or destination (write) of the data transfer. The third device on DSD bus 650 is inactive. NCR53C720 682 and DSDC 636 may be either a bus master or a bus slave, while memory 680 may only be a bus slave. Arbitration logic 786 in DSDC 636 may determine which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 may relinquish bus mastership after transferring eight long words. However, if more data needs to be transferred, NCR53C720 682 may wait 5 to 8 clock cycles and then initiates arbitration to regain bus mastership to transfer up to 8 more long words. This process may continue until the block move instruction is complete. In the exemplary embodiment, the effective data transfer rate of a block move instruction to/from the SCSI disk(s) may be in excess of 20 MB/s.

Referring specifically to FIG. 11, wherein an exemplary read operation is shown with NCR53C720 682 as bus master and DSDC 636 is bus slave. The signal names provided along the left side of timing diagram 1000 generally correspond to the signals described with reference to FIGS. 9A and 9B.

At time 1004, NCR53C720 682 may assert a hold signal as shown at 1006, indicating to all of the devices coupled to DSD bus 650 that NCR53C720 682 is requesting bus mastership. Arbitration logic 786 within DSDC 636 may receive the hold signal 1006 and may assert a hold acknowledge signal in response thereto, as shown at 1008, indicating that the previous bus master has relinquished control of DSD bus 650. On the next bus clock cycle, NCR53C720 682 may assert a master signal to DSDC 636 as shown at 1010, indicating to DSDC 636 that NCR53C720 682 has become bus master of DSD bus 650. NCR53C720 682 may then assert an address status signal as shown at 1012. The address status signal indicates the start of a bus cycle. Shortly thereafter, and while the address status signal is still asserted, NCR53C720 682 may provide an address to DSDC 636 as shown at 1014. The select slave field of the address may select DSDC 636 to be the slave for this bus transaction.

NCR53C720 682 may then provide a read/write signal 1018 to DSDC 636. The read/write signal 1018 indicates that NCR53C720 682 is requesting to read data from DSDC 636. Finally, DSDC 636 may provide a ready-in 1022 signal to NCR53C720 682, indicating that DSDC 636 is ready to transfer data thereto. The read data on DSD bus 650 may then be provided as shown at 1020.

Figure 12:
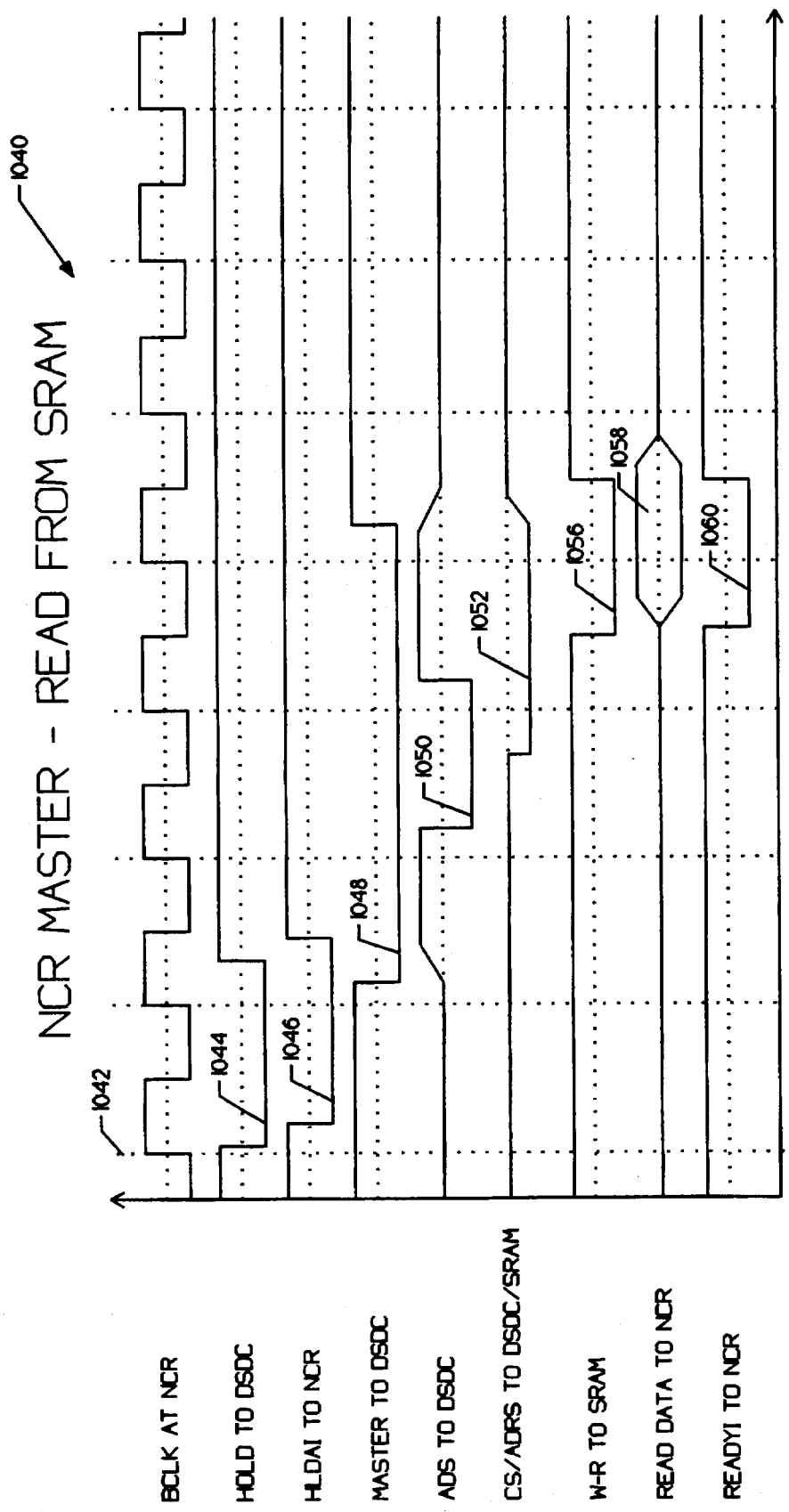
FIG. 12 is a thing diagram illustrating an exemplary read cycle on the DSD bus wherein the NCR chip is the master and the SRAM device is the slave.

FIG. 12 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS. 9A and 9B.

At time 1042, NCR53C720 682 may assert a hold signal as shown at 1044, indicating to all of the devices coupled to DSD bus 650 that NCR53C720 682 is requesting bus mastership. Arbitration logic 786 within DSDC 636 may receive the hold signal 1044 and may assert a hold acknowledge signal in response thereto, as shown at 1046, indicating that the previous bus master has relinquished control of DSD bus 650. On the next bus clock cycle, NCR53C720 682 may assert a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 may then assert an address status signal as shown at 1050. The address status signal indicates the start of a bus cycle. Shortly thereafter, and while the address status signal is still asserted, NCR53C720 682 may provide an address to DSDC 636 and memory 680 as shown at 1052. The select slave field of the address may select memory 680 to be the slave for this bus transaction.

NCR53C720 682 may then provide a read/write signal 1056 to memory 680. The read/write signal 1056 indicates that NCR53C720 682 is requesting to read data from memory 680. Finally, memory 680 may provide a ready-in signal 1060 to NCR53C720 682, indicating that memory 680 is ready to transfer data thereto. The read data on DSD bus 650 is shown at 1058.

Figure 13:
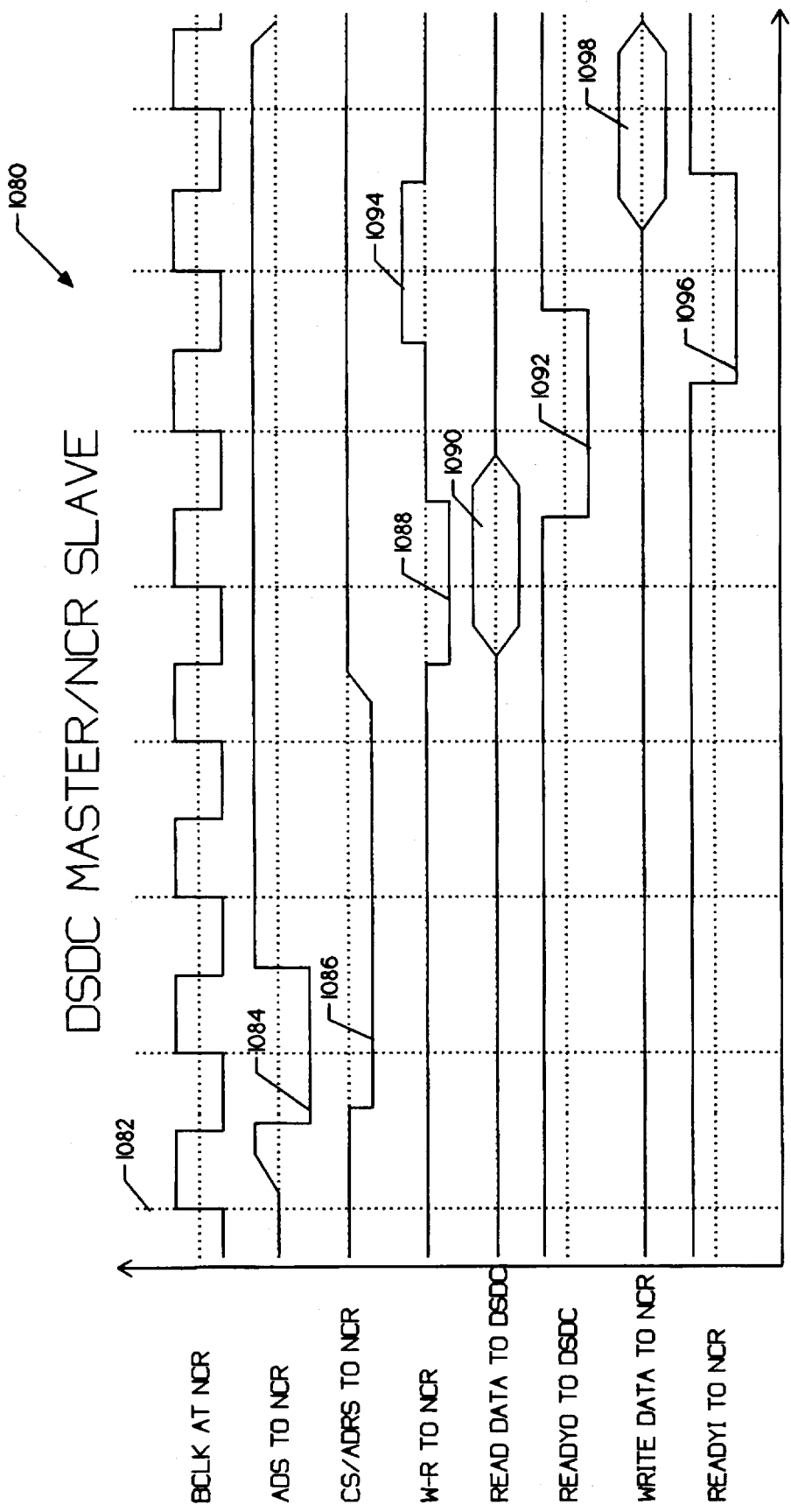
FIG. 13 is a timing diagram illustrating an exemplary read and write cycle on the DSD bus wherein the DSDC device is the master and the NCR chip is the slave.

FIG. 13 is a timing diagram illustrating an exemplary read and write cycle on the DSD bus wherein the DSDC device is the master and the NCR53C720 is the slave. The timing diagram is generally shown at 1080. At time 1082, DSDC 636 may assert an address status signal as shown at 1084. The address status signal indicates to NCR53C720 682 the start of a bus cycle. Shortly thereafter, and while the address status signal is still asserted, DSDC 636 may provide a chip select signal and an address to NCR53C720 682 and memory 680 as shown at 1086. The chip select signal selects the NCR53C720 682 as the slave device. The chip select signal may comprise the slave select field 972 of the DSD address 964.

DSDC 636 may then provide a read/write signal 1088 to NCR53C720 682. At 1088, DSDC 636 provides a low on the read/write signal indicating that DSDC 636 is requesting a read from NCR53C720 682. NCR53C720 682 may then provide the requested read data to DSDC 636 as shown at 1090. Thereafter, NCR53C720 682 may provide a ready-out signal 1092 to DSDC 636 to indicate the end of the slave bus cycle.

DSDC 636 may then provide a read/write signal 1094 to NCR53C720 682. At 1094, DSDC 636 provides a high on the read/write signal indicating that DSDC 636 is requesting to write to NCR53C720 682. DSDC 636 may provide a ready-in signal 1096 to NCR53C720 682, indicating that DSDC 636 is ready to write data thereto. DSDC 636 may then provide the write data to NCR53C720 682 as shown at 1098.

Figure 14:
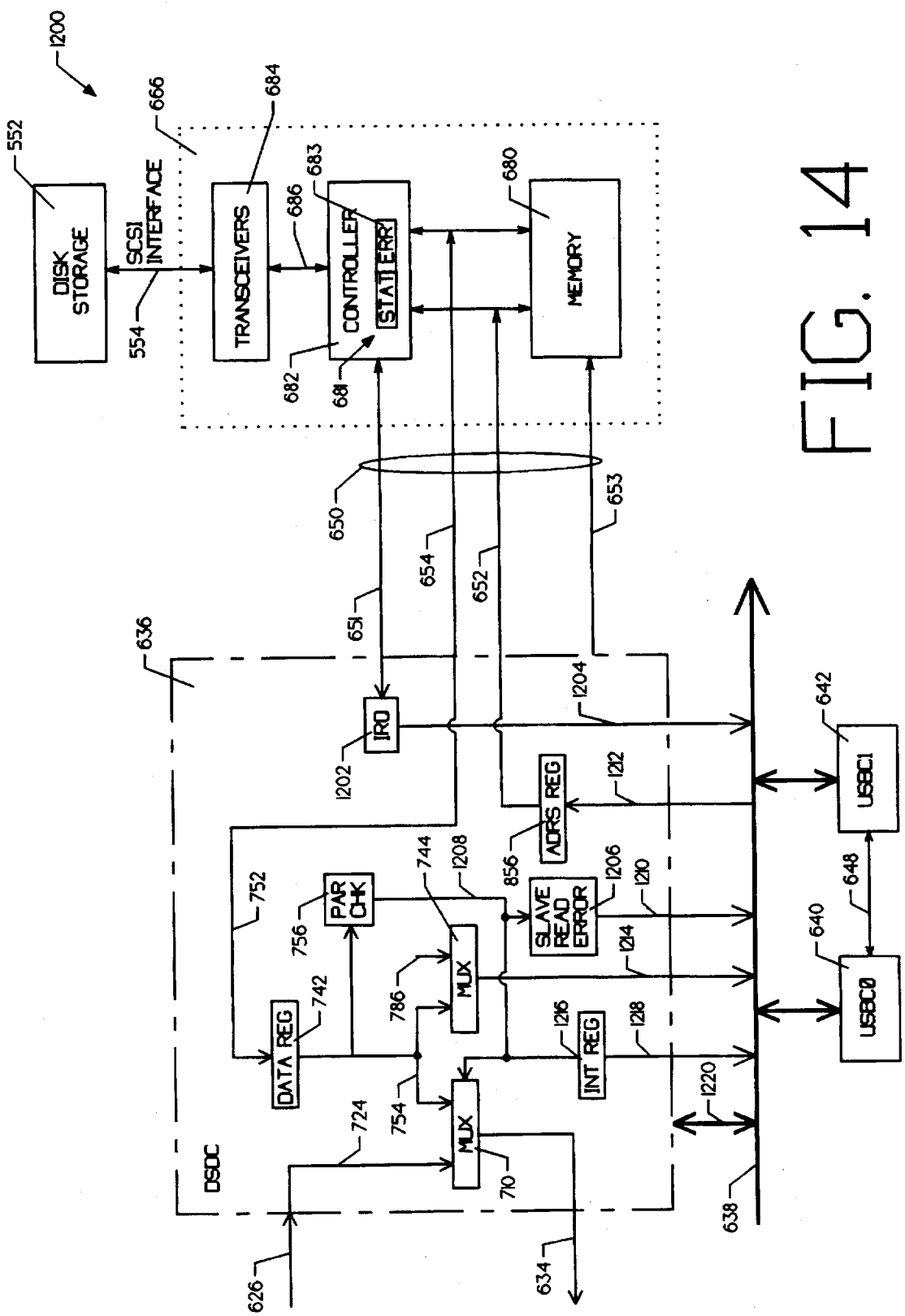
FIG. 14 is a schematic diagram of a second exemplary embodiment of the present invention, which is incorporated into the computer system described with reference to FIG. 5 through FIG. 13.

FIG. 14 is a schematic diagram of a second exemplary embodiment of the present invention, which is incorporated into the computer system described with reference to FIG. 5 through FIG. 13. The schematic diagram is generally shown at 1200. As indicated above, DSDC 636 may be coupled to disk controller 682 and memory 680 via DSD bus 650. DSDC 636, disk controller 682, and memory 680 may communicate via DSD bus 650 using the predetermined bus protocol described above. Disk storage element 552 may be coupled to disk controller 682 via a SCSI bus 554 and a number of transceivers 684. The SCSI bus protocol may not be compatible with the DSD bus protocol. Disk storage element 552 may comprise a number of SCSI disk drives. Disk storage element 552 may communicate with DSDC 636 and memory 680 via disk controller 682.

In the exemplary embodiment, DSDC 636 may provide a data transfer path from disk storage element 552 to a non-volatile memory 540 (see FIGS. 5–7). DSDC 636 may read or write a number of data elements from/to disk storage element 552 via disk controller 682. DSDC 636 may then write or read the number of data elements to/from DBIF 618. DBIF 618 may then write or read the number of data elements to/from non-volatile memory element 540 via a number of streets 542. This data transfer path may be used to perform a fast data save and/or data restore operation from non-volatile memory 540 to/from disk storage element 552. DSDC 636 may be controlled by a microsequencer 640 via MBUS 638. Further detail on the Data Save Disk (DSD) system may be found in the above referenced co-pending patent application, which is incorporated herein by reference.

In the exemplary embodiment, disk controller 682 may have an error detection capability wherein the error detection capability may assert an error bit 683 in a status register 681 within disk controller 682 when an error is detected on SCSI bus 554. Disk controller 682 may then pass the uncorrected data to DSDC 636 during a data transfer via DSD bus 650.

During a data restore operation, USBC0 640 may instruct disk controller 682 to upload data from disk storage element 552 to non-volatile memory 540. In this mode, disk controller 682 may be the master of DSD bus 650 and DSDC 636 may be the slave. Disk controller 682 may read a number of data elements from disk storage element 552 and provide the number of data elements to DSD data bus 654. The number of data elements may be sequentially provided to data-in register 742 within DSDC 636 via interface 752. Data-in register 742 may be coupled to a parity check block 756, and may be further coupled to multiplexer 710 and multiplexer 744 via interface 754. During the data restore operation, data-in-register 742 may provide the number of data elements to multiplexer 710 wherein multiplexer 710 may direct the number of data elements to DBIF 618 via interface 634. Thereafter, DBIF 618 may direct the number of data elements to non-volatile memory 540 via the number of streets.

As indicated above, parity check block 756 may be coupled to the output of data-in register 742. Parity check block 756 may check the parity of each of the number of data elements provided by disk controller 682. In the exemplary embodiment, disk controller 682 may provide an IRQ signal to an IRQ register 1202 which may be located in DSDC 636. Disk controller 682 may provide the IRQ signal when disk controller 682 completes a predefined set of data transfers. USBC0 640 may then read the contents of IRQ register 1202 via interface 1204 to determine when disk controller 682 may stop providing data to DSDC 636. That is, disk controller 682 may provide a number of data elements to DSDC 636 even after an error is detected by disk controller 682. That is, a number of corrupted data elements may be passed to data-in register 742 before a corresponding data transfer is completed.

Because disk controller 682 may pass uncorrected data to DSDC 636, parity check block 756 may provide the necessary error detection capability thereto. If parity check block 756 detects an error, parity check block 756 may select interface 626 of multiplexer 710, rather than interface 754. This may allow DSDC 636 to ignore or otherwise prevent the corrupted data elements provided by disk controller 682 from passing to DBIF 618 or into DSDC 636. Parity check block 756 may also provide a parity error signal to a slave read error block 1206 via interface 1208. The operation of the slave read error block 1206 is discussed herein. Finally, parity check block 756 may set a DSD bus error bit in an interrupt register 1216.

USBC0 640 may monitor interrupt register 1216 via interface 1218. Once a DSD bus error is detected, USBC0 640 may initiate a read operation of status register 681 of disk controller 682 by providing an address to address register 856 via interface 1212. The address may correspond to the status register of disk controller 682. In response thereto, disk controller 682 may provide a status word to data-in register 742 via DSD data bus 654. Parity check block 756 may then check the parity of the status word. If a parity error is detected, parity check block 756 may provide a parity error signal to slave read error block 1206. In the exemplary embodiment, slave read error block 1206 may provide a slave read error when a parity error is detected in the status word, and whenever DSDC 636 is reading status register 681 and when data-in register 742 is enabled (see FIG. 15). USBC0 640 may read the contents of slave read error block 1206 during a first read cycle. Thereafter, multiplexer 744 may be set to select the output of data-in register 742 wherein USBC0 640 may read the status word from data-in register 742 during a second read operation.

USBC0 640 may then isolate the source of the error using the slave read error and the status word. If the slave read error is set, it is assumed that the source of the error is either DSD bus 650 or DSDC 636. However, if the slave read error is not set, the error bit 683 of the status word may be analyzed. If the error bit 683 indicates that disk controller 682 detected an error on SCSI bus 554, it is assumed that the source of the error is either SCSI bus 552 or disk controller 682. Although this invention does not completely isolate the source of the error, the information provided thereby may greatly reduce the amount of analysis required by a service technician and/or a dedicated test system.

Figure 15:
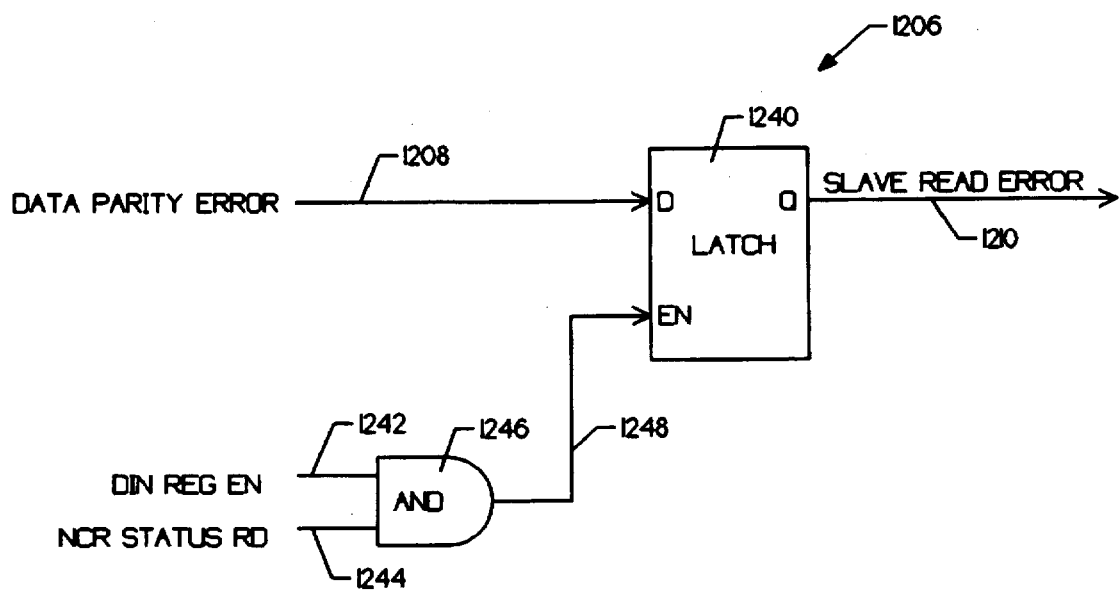
FIG. 15 is a schematic diagram of the slave read error block of FIG. 14.

FIG. 15 is a schematic diagram of the slave read error block of FIG. 14. The schematic diagram is generally shown at 1206. Slave read error block 1206 may have a latch 1240 and an and gate 1246. An enable input port of latch 1240 may be coupled to an output port of and gate 1246. A data input port of latch 1240 may be coupled to parity check block 756 via interface 1208 (see FIG. 14). That is, the data input port of latch 1240 may be set whenever parity check block 756 detects a parity error on interface 754.

Latch 1240 may be enabled whenever data-in register 742 is enabled and when DSDC 636 is reading status register 681 of disk controller 682. It is contemplated that DSDC 636 may provide an enable signal on interface 1242, indicating when data-in register 742 is enabled. It is further contemplated that DSDC 636 may provide a signal on interface 1244, indicating when DSDC 636 is reading status register 681.

In view of the foregoing, slave read error block 1206 may provide a slave read error when a parity error is detected on interface 754, and whenever DSDC 636 is reading status register 681 and when data-in register 742 is enabled. The slave read error may be provided to UBSC0 640 via interface 1210.

FIG. 16 is a table showing an exemplary error isolation algorithm of the present invention. The table is generally shown at 1260. All possible combinations for the slave read error and the status register error bit are shown. The status register error bit values are shown in column 1262. Similarly, the slave read error values are shown in column 1264. Finally, the source of the corresponding error is shown in column 1266.

When the status register error bit is not set and the slave read error is not set, no error is indicated and processing may be reseed. When the status read error bit is not set and the slave read error is set, it is assumed that the source of the error is either DSD bus 650 or DSDC 636. When the status read error bit is set and the slave read error is not set, it is assumed that the source of the error is either SCSI bus 554 or disk controller 682. Finally, when the status read error bit is set and the slave read error is set, it is assumed that the source of the error is either DSD bus 650 or DSDC 636.

Although this invention does not completely isolate the source of the error, the information provided thereby may greatly reduce the amount of analysis required by a service technician and/or a dedicated test system.

Figure 17A:
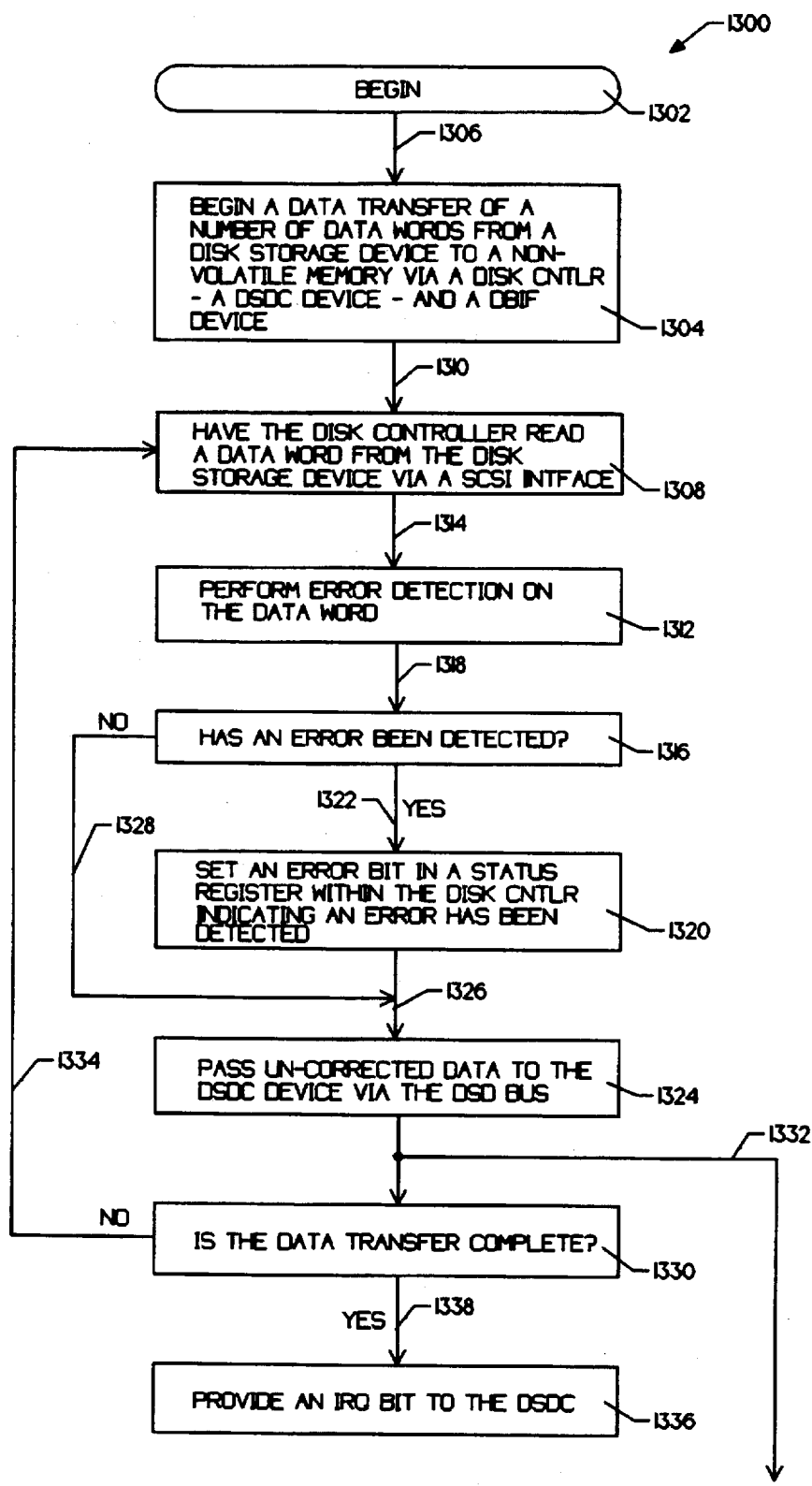
FIG. 17A and FIG. 17B comprise a flow diagram illustrating an exemplary operation of the embodiment shown in FIG. 14 through FIG. 16.
Figure 17B:
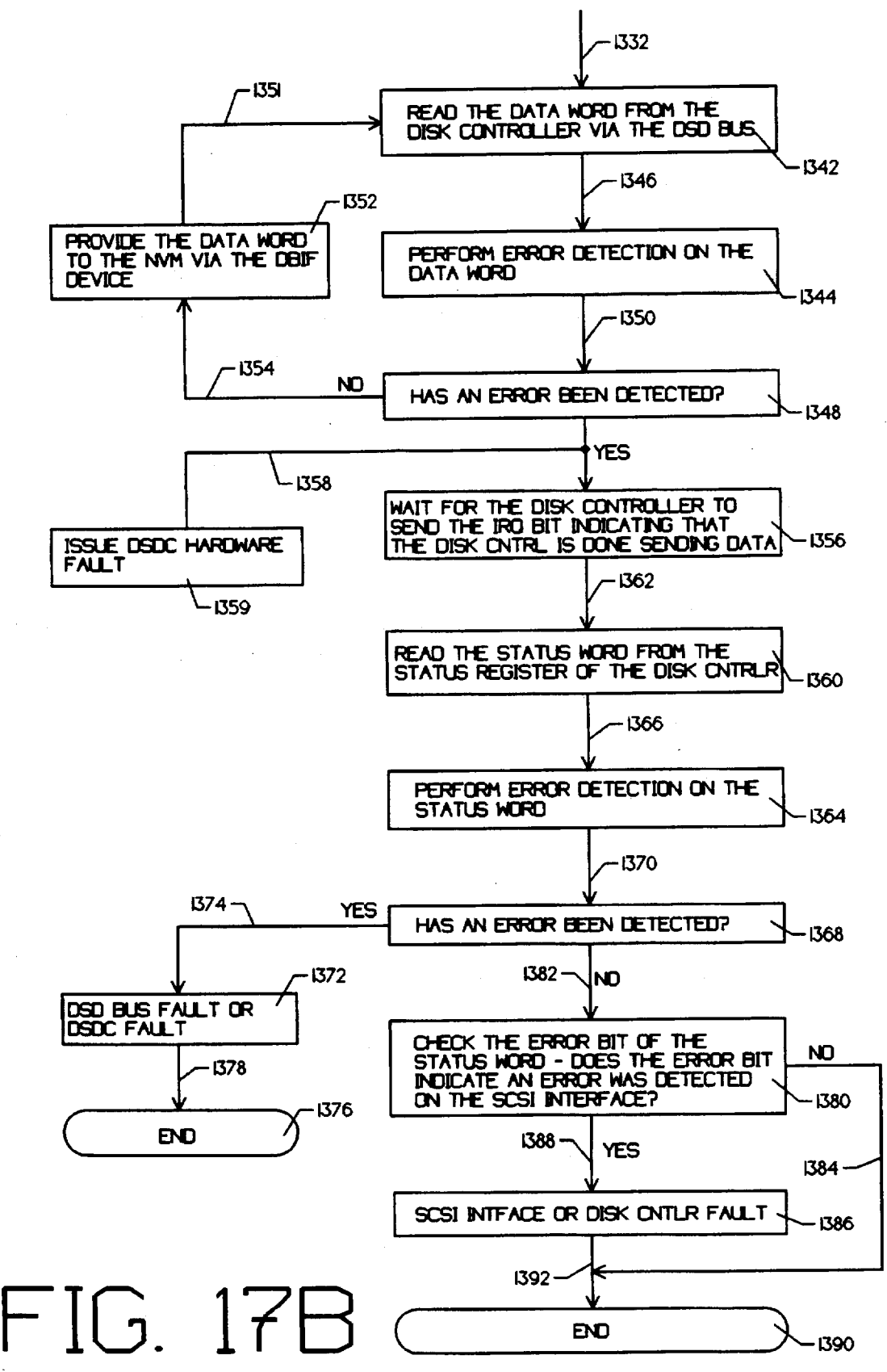

FIG. 17A and FIG. 17B comprise a flow diagram illustrating an exemplary operation of the embodiment shown in FIG. 14 through FIG. 16. The flow diagram is generally shown at 1300. The algorithm is entered at element 1302, wherein control is passed to element 1304 via interface 1306. Element 1304 begins a data transfer of a number of data words from a disk storage element to a non-volatile memory via a disk controller, a DSDC device, and a DBIF device. Control is then passed to element 1308 via interface 1310. Element 1308 has the disk controller read a data word from the disk storage element via a SCSI interface. Control is then passed to element 1312 via interface 1314. Element 1312 performs error detection on the data word. Control is then passed to element 1316 via interface 1318. Element 1316 determines whether an error has been detected in the data word. If an error has been detected in the data word, control is passed to element 1320 via interface 1322. Element 1320 sets an error bit in a status register within the disk controller, thereby indicating an error has been detected. Control is then passed to element 1324 via interface 1326.

Referring back to element 1316, if an error has not been detected in the data word, control is passed to element 1324 via interface 1328. Element 1324 passes the uncorrected data word to the DSDC device via the DSD bus. Control is then passed to element 1330 and to element 1342 via interface 1332. Referring to element 1330, element 1330 determines whether the data transfer is complete. If the data transfer is not complete, control is passed back to element 1308 via interface 1334. However, if the data transfer is complete, control is passed to element 1336 via interface 1338. Element 1336 provides an IRQ bit to the DSDC device.

Referring to element 1342, element 1342 reads the data word from the disk controller via the DSD bus. Control is then passed to element 1344 via interface 1346. Element 1344 performs error detection on the data word. Control is then passed to element 1348 via interface 1350. Element 1348 determines whether an error has been detected in the data word. If an error has not been detected in the data word, control is passed to element 1352 via interface 1354. Element 1352 provides the data word to the non-volatile memory via the DBIF device. Control is then passed to element 1342 via interface 1351.

Referring to element 1348, if an error has not been detected in the data word, control is passed to element 1356 and to element 1359 via interface 1358. Element 1359 issues a DSDC hardware fault indicating an error was detected in the DSDC ASIC. Element 1356 then waits for the disk controller to send the IRQ bit indicating that the disk controller is done sending data. Meanwhile, DSDC may ignore or otherwise prevent the corrupted data elements provided by the disk controller from passing to the DBIF device or into the DSDC device. Control is then passed to element 1360 via interface 1362. Element 1360 reads the status word from the status register of the disk controller. Control is then passed to element 1364 via interface 1366. Element 1364 performs error detection on the status word. Control is then passed to element 1368 via interface 1370. Element 1368 determines whether an error has been detected in the status word. If an error has been detected in the status word, control is passed to element 1372 via interface 1374. Element 1372 indicates that a DSD bus fault or a DSDC device fault occurred. Control is then passed to element 1376 via interface 1378, wherein the algorithm is ended.

Referring back to element 1368, if an error has not been detected in the status word, control is passed to element 1380 via interface 1382. Element 1380 checks the error bit of the status word and determines whether the error bit indicates that an error was detected on the SCSI interface. If the error bit indicates that an error was not detected on the SCSI interface, control is passed to element 1390 via interface 1384, wherein the algorithm is exited. However, if the error bit indicates that an error was detected on the SCSI interface, control is passed to element 1386 via interface 1388. Element 1386 indicates that a SCSI interface fault or a disk controller fault occurred. Control is then passed to element 1390 via interface 1392, wherein the algorithm is ended.

Having thus described the preferred embodiments of the present invention, those of skill in the art will readily appreciate that the teachings found herein may be applied to yet other embodiments within the scope of the claims hereto attached.

We claim:

1. An apparatus comprising:
    a. a first bus;
    b. a second bus;
    c. a bus user coupled to said second bus;
    d. interface means coupled to said first bus and further coupled to said bus user via said second bus, said interface means capable of reading a number of data elements from said bus user over said second bus, said interface means further comprising:
        i. second bus error detection means for performing error detection on said number of data elements as said number of data elements are read over said second bus;
        ii. storing means coupled to said second bus error detection means for storing an error code when said second bus error detection means detects an error in one of the number of data elements;
    e. controller means coupled to said first bus, said controller means reading the number of data elements from said interface means over said first bus, said controller means further comprising:
        i. first bus error detection means for performing error detection on said number of data elements as said number of data elements are read over said first bus;
        ii. reading means coupled to said storing means for reading said error code from said storing means when said first bus error detection means detects an error;
        iii. error code error detection means coupled to said reading means for performing error detection on said error code thereby resulting in a slave read error code when said first bus error detection means detects an error; and
        iv. error isolating means coupled to said error code error detection means and further coupled to said reading means for isolating said error.

2. An apparatus according to claim 1 wherein said bus user comprises a disk storage element.

3. An apparatus according to claim 2 wherein said interface means comprises a disk controller.

4. An apparatus according to claim 3 wherein said controller comprises a DSDC, Data Save Disk Chip, element.

5. An apparatus comprising:
    a. a first bus wherein said first bus includes a DSD, Data Save Disk, bus;
    b. a second bus;
    c. a bus user coupled to said second bus wherein said bus user includes a disk storage element;
    d. interface means coupled to said first bus and further coupled to said bus user via said second bus, said interface means capable of reading a number of data elements from said bus user over said second bus, said interface means includes a disk controller, said interface means further comprising:
   i. second bus error detection means for performing error detection on said number of data elements as said number of data elements are read over said second bus;
   ii. storing means coupled to said second bus error detection means for storing an error code when said second bus error detection means detects an error in one of the number of data elements;
  e. controller means coupled to said first bus, wherein said controller means includes a DSDC, Data Save Disk Chip, element, said controller means reading the number of data elements from said interface means over said first bus, said controller means further comprising:
   i. first bus error detection means for performing error detection on said number of data elements as said number of data elements are read over said first bus;
   ii. reading means coupled to said storing means for reading said error code from said storing means when said first bus error detection means detects an error;
   iii. error code error detection means coupled to said reading means for performing error detection on said error code thereby resulting in a slave read error code; and
   iv. error isolating means coupled to said error code error detection means and further coupled to said reading means for isolating said error.

6. An apparatus according to claim 5 wherein said second bus comprises a SCSI bus.

7. An apparatus according to claim 6 wherein said storing means comprises a status register.

8. An apparatus according to claim 7 wherein said second bus error detection means comprises a parity error check block.

9. An apparatus according to claim 8 wherein said second bus error detection means comprises a parity error check block.

10. An apparatus according to claim 9 wherein said error code error detection means comprises a parity error check block.

11. An apparatus according to claim 10 wherein said error isolation means comprises a microsequencer.

12. An apparatus comprising:
  a. a first bus;
  b. a second bus;
  c. a bus user coupled to said second bus;
  d. an interface circuit coupled to said first bus and further coupled to said bus user via said second bus, said interface circuit capable of reading a number of data elements from said bus user over said second bus, said interface circuit further comprising:
   i. a second bus error detection circuit for performing error detection on said number of data elements as said number of data elements are read over said second bus;
   ii. a storing circuit coupled to said second bus error detection circuit for storing an error code when said second bus error detection circuit detects an error in one of the number of data elements;
  e. a controller circuit coupled to said first bus, said controller circuit reading the number of data elements from said interface circuit over said first bus, said controller circuit further comprising:
   i. a first bus error detection circuit for performing error detection on said number of data elements as said number of data elements are read over said first bus;
   ii. a reading circuit coupled to said storing circuit for reading said error code from said storing circuit when said first bus error detection circuit detects an error;
   iii. an error code error detection circuit coupled to said reading circuit for performing error detection on said error code thereby resulting in a slave read error code; and
   iv. an error isolating circuit coupled to said error code error detection circuit and further coupled to said reading circuit for isolating said error.

13. A method for isolating an error within a computer system wherein the computer system has a bus user, an interface device, and a controller, wherein the controller is coupled to said interface device via a first bus and the interface device is coupled to the bus user via a second bus, the interface device having an error detection capability wherein the error detection capability sets an error code if an error is detected on said second bus, the method comprising the steps of:
  a. reading a data word from the interface device to the controller via the first bus;
  b. performing error detection on said data word;
  c. determining if an error was detected in step (b);
  d. returning to step (a) if step (c) determines that an error was not detected;
  e. reading the error code from the interface device;
  f. performing error detection on the error code;
  g. determining if an error was detected in step (f);
  h. indicating a fault on the first bus/controller if said determining step (g) determines that an error was detected;
  i. exiting if said determining step (g) determines that an error was detected;
  j. determining if the error code indicates that an error was detected on the second bus; and
  k. indicating a fault on the second bus/interface device if said determining step (j) determines that the error code indicates that an error was detected on the second bus.

14. A method for isolating an error within a computer system wherein the computer system has a bus user, an interface device, and a controller, wherein the controller is coupled to said interface device via a first bus and the interface device is coupled to the bus user via a second bus, the interface device having an error detection capability wherein the error detection capability sets an error code if an error is detected on said second bus, the interface device providing a number of data elements to the controller, the method comprising the steps of:
  a. reading one of the number of data elements from the interface device to the controller via the first bus;
  b. performing error detection on said one of the number of data elements;
  c. determining if an error was detected in step (b);
  d. returning to step (a) if step (c) determines that an error was not detected;
  e. disregarding any further data words which are provided by the interface device while waiting for all of the number of data elements to be provided by the interface device to the controller;
  f. reading the error code from the interface device;

g. performing error detection on the error code;

h. determining if an error was detected in step (g);

i. indicating a fault on the first bus/controller if said determining step (h) determines that an error was detected;

j. exiting if said determining step (h) determines that an error was detected;

k. determining if the error code indicates that an error was detected on the second bus; and l. indicating a fault on the second bus/interface device if said determining step (k) determines that the error code indicates that an error was detected on the second bus.

15. A method for isolating an error within a computer system wherein the computer system has a bus user, an interface device, and a controller, wherein the controller is coupled to said interface device via a first bus and the interface device is coupled to the bus user via a second bus, the method comprising the steps of:

a. reading a data word from the bus user to the interface device via the second bus;

b. performing error detection on said data word;

c. determining if an error was detected in step (b);

d. setting an error code within the interface device if said determining step (c) determined that an error was detected;

e. reading said data word from the interface device to the controller via the first bus;

f. performing error detection on said data word;

g. determining if an error was detected in step (f);

h. returning to step (f) if step (g) determined that an error was not detected;

i. reading said error code from the interface device;

j. performing error detection on said error code;

k. determining if an error was detected in step (j);

l. indicating a fault on the first bus or the controller if said determining step (k) determines that an error was detected;

m. exiting if said determining step (k) determines that an error was detected;

n. determining if said error code indicates that an error was detected on the second bus; and o. indicating a fault on the second bus or the interface device if said determining step (n) determines that said error code indicates that an error was detected on the second bus.

16. A method for isolating an error within a computer system wherein the computer system has a disk storage element, a disk controller, and a DSDC, Data Save Disk Chip, element, wherein the DSDC, Data Save Disk Chip, element is coupled to said disk controller via a first bus and the disk controller is coupled to the disk storage element via a second bus, the disk controller having an error detection capability wherein the error detection capability sets an error code if an error is detected on said second bus, the method comprising the steps of:

a. reading a data word from the disk controller to the DSDC, Data Save Disk Chip, element via the first bus;

b. performing error detection on said data word;

c. determining if an error was detected in step (b);

d. returning to step (a) if step (c) determines that an error was not detected;

e. reading the error code from the disk controller;

f. performing error detection on the error code;

g. determining if an error was detected in step (f);

h. indicating a fault on the first bus/DSDC, Data Save Disk Chip, element if said determining step (g) determines that an error was detected;

i. exiting if said determining step (g) determines that an error was detected;

j. determining if the error code indicates that an error was detected on the second bus; and k. indicating a fault on the second bus/disk controller if said determining step (j) determines that the error code indicates that an error was detected on the second bus.

17. A method for isolating an error within a computer system wherein the computer system has a disk storage element, a disk controller, and a DSDC, Data Save Disk Chip, element, wherein the DSDC, Data Save Disk Chip, element is coupled to said disk controller via a first bus and the disk controller is coupled to the disk storage element via a second bus, the method comprising the steps of:

a. reading a data word from the disk storage element to the disk controller via the second bus;

b. performing error detection on said data word;

c. determining if an error was detected in step (b);

d. setting an error code within the disk controller if said determining step (c) determined that an error was detected;

e. reading said data word from the disk controller to the DSDC, Data Save Disk Chip, element via the first bus;

f. performing error detection on said data word;

g. determining if an error was detected in step (f);

h. returning to step (f) if step (g) determined that an error was not detected;

i. reading said error code from the disk controller;

j. performing error detection on said error code;

k. determining if an error was detected in step (j);

l. indicating a fault on the first bus/DSDC, Data Save Disk Chip, element if said determining step (k) determines that an error was detected;

m. exiting if said determining step (k) determines that an error was detected;

n. determining if said error code indicates that an error was detected on the second bus; and o. indicating a fault on the second bus/disk controller if said determining step (n) determines that said error code indicates that an error was detected on the second bus.

* * * * *